United States Patent
Suresh et al.

(10) Patent No.: US 11,469,896 B2
(45) Date of Patent: *Oct. 11, 2022

(54) METHOD FOR SECURING THE RENDEZVOUS CONNECTION IN A CLOUD SERVICE USING ROUTING TOKENS

(71) Applicant: Citrix Systems, Inc., Fort Lauderdale, FL (US)

(72) Inventors: Viswanath Yarangatta Suresh, Bengaluru (IN); Roberto Valdes, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/351,888

(22) Filed: Jun. 18, 2021

(65) Prior Publication Data

US 2021/0314160 A1    Oct. 7, 2021

Related U.S. Application Data

(63) Continuation of application No. 16/223,965, filed on Dec. 18, 2018, now Pat. No. 11,050,566.

(51) Int. Cl.
*H04L 9/32* (2006.01)
*H04L 45/02* (2022.01)
(Continued)

(52) U.S. Cl.
CPC .......... *H04L 9/3228* (2013.01); *H04L 9/3213* (2013.01); *H04L 45/02* (2013.01); *H04L 45/42* (2013.01); *H04L 45/72* (2013.01)

(58) Field of Classification Search
CPC ..... H04L 9/3228; H04L 9/3213; H04L 45/02; H04L 45/42; H04L 45/72; H04L 67/08; H04W 12/108
See application file for complete search history.

(56) References Cited

U.S. PATENT DOCUMENTS 9,538,345 B2    1/2017   Sah et al.
2007/0005786 A1*   1/2007   Kumar ............... H04L 41/5012
                                                        709/230

(Continued)

FOREIGN PATENT DOCUMENTS

EP    2 391 087 A1    11/2011
WO   WO-2007/081566 A2    7/2007
WO   WO-2016/102297 A1    6/2016

OTHER PUBLICATIONS

Examination Report on AU Appl. No. 2019402945 dated Jun. 15, 2021.

(Continued)

*Primary Examiner* — Brian Whipple
*Assistant Examiner* — James Ross Hollister
(74) *Attorney, Agent, or Firm* — Foley & Lardner LLP

(57) ABSTRACT

Systems and methods for establishing a secure connection are described. A server receives a plurality of routing tokens for establishing a service connection between a service node and the server along a network path through a plurality of network devices. The routing tokens can be validated by a corresponding network device. The server transmits a packet including the routing tokens to a first network device. The first network device validates a first routing token associated therewith, then directs the packet along the network path to a second network device, and so forth, until each of the network device receives and validates their routing token. The server establishes a cryptographic context between the service node and server for establishing a secure channel between the service node and the server. The server transmits a service node routing token to the service node via the secure channel for validation.

20 Claims, 11 Drawing Sheets

(51) Int. Cl.
  *H04L 45/42* (2022.01)
  *H04L 45/00* (2022.01)

(56) References Cited

U.S. PATENT DOCUMENTS

| | | | | |
|---|---|---|---|---|
| 2007/0133488 A1* | 6/2007 | Muthuswamy | ......... | H04L 47/10 370/338 |
| 2007/0153764 A1* | 7/2007 | Thubert | ................ | H04L 45/025 370/392 |
| 2008/0115203 A1* | 5/2008 | Elzur | .................. | H04L 63/0485 726/14 |
| 2010/0011215 A1* | 1/2010 | Lior | .................... | H04L 63/0823 713/168 |
| 2011/0179277 A1* | 7/2011 | Haddad | ................. | H04L 9/0827 713/171 |
| 2011/0296486 A1* | 12/2011 | Burch | ................. | H04L 63/0807 709/224 |
| 2014/0040610 A1* | 2/2014 | Ben-Itzhak | ........... | H04L 63/166 713/156 |
| 2017/0039568 A1* | 2/2017 | Tunnell | .................... | G06F 21/33 |
| 2017/0195457 A1* | 7/2017 | Smith, II | ................ | H04L 63/06 |
| 2018/0255036 A1* | 9/2018 | Fiedler | .................. | H04L 43/106 |

OTHER PUBLICATIONS

International Preliminary Report on Patentability for International Appl. No. PCT/US2019/065424 dated Jul. 1, 2021.
International Search Report and Written Opinion for International Appl. No. PCT/US2019/065424, dated Mar. 5, 2020.
Final Office Action on U.S. Appl. No. 16/223,965 dated Dec. 22, 2020.
Non-Final Office Action on U.S. Appl. No. 16/223,965, dated May 29, 2020.
Notice of Allowance on U.S. Appl. No. 16/223,965 dated Mar. 5, 2021.

\* cited by examiner

METHOD FOR SECURING THE RENDEZVOUS CONNECTION IN A CLOUD SERVICE USING ROUTING TOKENS

CROSS-REFERENCE TO RELATED APPLICATION

This application is a continuation of and claims priority to and the benefit of U.S. patent application Ser. No. 16/223,965, titled "METHOD FOR SECURING THE RENDEZVOUS CONNECTION IN A CLOUD SERVICE USING ROUTING TOKENS," and filed on Dec. 18, 2018, the contents of all of which are hereby incorporated herein by reference in its entirety for all purposes.

FIELD OF THE DISCLOSURE

The present application generally relates to securing a connection, including but not limited to systems and methods for securing a connection in a cloud services environment using routing tokens.

BACKGROUND

In a typical computing environment, a client (also referred to as a client device) receives information, traffic, packets, etc., from a server. Packets may be encrypted by a server using various cryptographic algorithms prior to transmission over a network. In some instances, the packets may be communicated from the server, through one or more network or other intermediary devices, and to the client. In such instances, it may be computationally difficult and/or expensive to map out or otherwise identify the path in which the packets are passed between the server and client.

BRIEF SUMMARY

This summary is provided to introduce a selection of concepts in a simplified form that are further described below in the Detailed Description. This summary is not intended to identify key features or essential features, nor is it intended to limit the scope of the claims included herewith.

Described herein are systems and methods for establishing a secure connection using routing tokens. Various network devices can be located intermediary between a service node and a server. Routing tokens can be provided to the network devices located along the network path between the service node and server, to specify or map out a network path for the secure connection. In some embodiments, the routing tokens are provided in or with an initial packet containing cryptographic context negotiation handshake protocol information (for instance, Secure Socket Layer (SSL) client hello, Datagram Transport Layer Security (DTLS) client hello, etc.). Each network device located along the network path identifies, reads, and/or validates their corresponding applicable routing token. The network devices can identify the next network device (also referred to herein sometimes as "node") along the network path, and pass the initial packet to the next network device. Such steps can be performed at each node along the network path between the service node and server. The server and service node can negotiate a cryptographic context along the network path identified using the routing tokens, which may be an end-to-end cryptographic context. Following establishment of the cryptographic context between the server and service node, the server may provide a service node routing token for the service node over the secure channel established via the cryptographic context. The service node may use the service node routing token to identify the client connection. Such embodiments may facilitate, expedite and simplify identification and/or establishment of the proper connection along a specified network path between the client and server, thus limiting the amount of computer resources needed to support or provide the service connection.

Various network devices, such as flow redirectors and proxy nodes, may be located intermediary between the service node and service. Routing tokens may be issued for each network device located along the network path for a given connection path between a client and server hosting a service. In some embodiments, the routing tokens may be valid for a particular interval of time. In some embodiments, the routing tokens may be valid for one-time use. In some embodiments, a plurality of network devices may use the same routing token (e.g., a first and second network device may use the same routing token). Such routing tokens may be provided to the server from, for instance, cloud-based controllers or processors, or other external devices which are communicably coupled to the server.

The client may communicate a request to access a service to the service node. Responsive to receiving the request, the service node may communicate connection information (e.g., corresponding to the service node and/or client), routing tokens, etc., to the cloud-based controller. The cloud-based controller may then provide the routing tokens (e.g., for both the network devices and the service node) to the server.

Once the server receives the routing tokens from the cloud-based controller, the server may initiate a connection towards the service node (e.g., through the network device (s) intermediary between the server and service node) based on the information received from the cloud-based controller.

The server may initiate negotiation of a cryptographic context between the adjacent network device (or directly with the service node) by providing a packet containing handshake information (also referred to herein as "initial handshake packet"), such as SSL/DTLS/etc. protocol handshake information. In some embodiments, the routing tokens for each of the network devices between the server and service node may be sent separate from (e.g., prior to, concurrently with, or subsequent to) the initial handshake packet. In some embodiments, the routing tokens for the network devices may be provided with the initial handshake packet. In such embodiments, the server may provide the initial handshake packet with the routing tokens to the first network device along the service connection. The first network device may read the routing token corresponding thereto, validate the routing token, identify the second network device, and pass the initial handshake packet to the second network device. In some embodiments, the first network device may strip, delete, remove, or otherwise extract the routing token for the first network device from the initial handshake packet. In such embodiments, the initial handshake packet received by the second network device may include each of the routing tokens except for the routing token for the first network device. In some embodiments, such as those where a routing token is conveyed to or passed through multiple network devices, the routing token may be removed by the last network device which uses the routing token, by the n-th network device adjacent to the service node, etc. The second network device may read the routing token corresponding to or designated for the second network device, validate the routing token, identify the third network device, and pass the initial handshake packet to the third network device. Such steps may be performed by each network device along the network path between the server and service node. Each of the routing tokens may be used for establishing, identifying, or otherwise determining the service connection between the server and service node. In each of these embodiments, the service node receives the initial handshake packet from the n-th network device without any routing tokens.

In some embodiments, following the network devices receiving and reading their corresponding routing tokens and thus establishing the service connection along the network path between the server and service node, the service node and server may directly negotiate the cryptographic context. In some embodiments, the service node may validate the server and/or service. For instance, where the initial handshake packet includes information for validating the server and/or service, the service node may validate the server and/or service based on such information. Similarly, the server and/or service may validate the service node during negotiation of the cryptographic context. For instance, the server and/or service may validate the service node through information received from the cloud-based controller. The cryptographic context between the server and service node may provide a secure channel (via the service connection) for exchanging data between the server and service node.

Following negotiation of the cryptographic context between the service node and server along the network path identified using the routing tokens, the server may provide, to the service node, a routing token for the service node (sometimes referred herein as "service node routing token"). The routing token for the service node may be communicated across the secure channel along the network path. In some embodiments, the service node authenticates the server and/or validates the secure channel based on the routing token. In some embodiments, the service node identifies a connection with the client based on the routing token for the service node. Following establishment (and, in some implementations, validation) of the secure channel, data traffic may be exchanged across the secure channel between the service node and server. The data traffic may be routed, provided, or otherwise delivered to the client via a local cryptographic context established between the service node and the client.

In one aspect, this disclosure is directed to a method for establishing a secure connection. The method includes receiving, by a server executing a service, a plurality of routing tokens for establishing a service connection between a service node and the server, along a network path through a plurality of network devices intermediary between the server and service node. Each of the routing tokens are configured to be validated by a corresponding network device of the plurality of network devices. The method includes transmitting, by the server towards the service node, a first packet comprising the plurality of routing tokens to a first network device of the plurality of network devices, to cause the first network device to validate a first routing token of the plurality of routing tokens and to direct the first packet along the network path to a second network device of the plurality of network devices according to the first routing token. The method includes establishing a cryptographic context between the service node and server along the network path identified using the routing tokens, to establish a secure channel between the service node and the server. The method includes transmitting, from the server to the service node via the secure channel, a service node routing token to be validated by the service node.

In some embodiments, the method further includes validating, by each of at least one of the server or the service node, the other one of the at least one of the server or the service node during negotiation of the cryptographic context. In some embodiments, the method further includes transmitting, from the server to the service node, handshake data for establishing the cryptographic context between the service node and the server. In some embodiments, the first packet includes the handshake data. The routing tokens may be removed from the handshake data prior to the handshake data being received by the service node.

In some embodiments, each of the plurality of routing tokens is valid for a predetermined duration of time. In some embodiments, each of the plurality of routing tokens is valid for one-time use by a respective network device of the plurality of network devices. In some embodiments, the method further includes communicating, by the server, network traffic with the service node using the established cryptographic context, without decrypting or re-encrypting the network traffic at each of the plurality of network devices. In some embodiments, the method further includes causing the service node to validate the service connection between the service node and the server, using the service node routing token. The method may further include causing the service node to identify, using the service node routing token, a client connection between the client and the service node. The client connection may have a local cryptographic context. The method may further include causing the service node to communicate network traffic between the client and the server, using the local cryptographic context across the client connection, and using the established cryptographic context across the secure channel between the service node and the server.

In some embodiments, the method further includes validating, by the server, the service connection by authenticating the service node. In some embodiments, the method further includes performing, by the server, negotiation of the cryptographic context directly with the service node using the handshake data responsive to establishing the service connection along the network path using the plurality of routing tokens.

According to another aspect, this disclosure is directed to a system for establishing a secure connection. The system includes a server in communication with a plurality of network devices intermediary between the server and a service node. The server provides a service to a client. The server is configured to receive a plurality of routing tokens for establishing a service connection between the service node and the server, along a network path through the plurality of network devices. Each of the routing tokens are configured to be validated by a corresponding network device of the plurality of network devices. The server is further configured to transmit a first packet comprising the plurality of routing tokens to a first network device of the plurality of network devices, to cause the first network device to validate a first routing token of the plurality of routing tokens and to direct the first packet along the network path to a second network device of the plurality of network devices according to the first routing token. The server is further configured to establish a cryptographic context between the service node and server, to establish a secure channel between the service node and the server. The server is further configured to transmit, from the server to the service node via the secure channel, a service node routing token to be validated by the service node.

In some embodiments, the system further includes the service node. Each of at least one of the server or the service node may be configured to validate the other one of the at least one of the server or the service node during negotiation of the cryptographic context. In some embodiments, the server is further configured to transmit handshake data to the service node for establishing the cryptographic context between the service node and server. In some embodiments, the first packet includes the handshake data. The routing tokens may be removed from the handshake data prior to the handshake data being received by the service node.

In some embodiments, each of the plurality of routing tokens are valid for a predetermined duration of time. In some embodiments, each of the plurality of routing tokens are valid for one-time use by a respective network device of the plurality of network devices. In some embodiments, the server is configured to communicate network traffic with the service node using the established cryptographic context, without decrypting or re-encrypting the network traffic at each of the plurality of network devices. In some embodiments, the server is further configured to cause the service node to validate the service connection between the service node and the server, using the service node routing token. The server may further be configured to cause the service node to identify, using the service node routing token, a client connection between the client and the service node, the client connection having a local cryptographic context. The server may further be configured to cause the service node to communicate network traffic between the client and the server, using the local cryptographic context across the client connection, and using the established cryptographic context across the secure channel between the service node and the server.

In some embodiments, the server is further configured to validate the service connection by authenticating the service node. In some embodiments, the server is further configured to perform negotiation of the cryptographic context directly with the service node using the handshake data responsive to establishing the service connection along the network path using the plurality of routing tokens

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 1A:
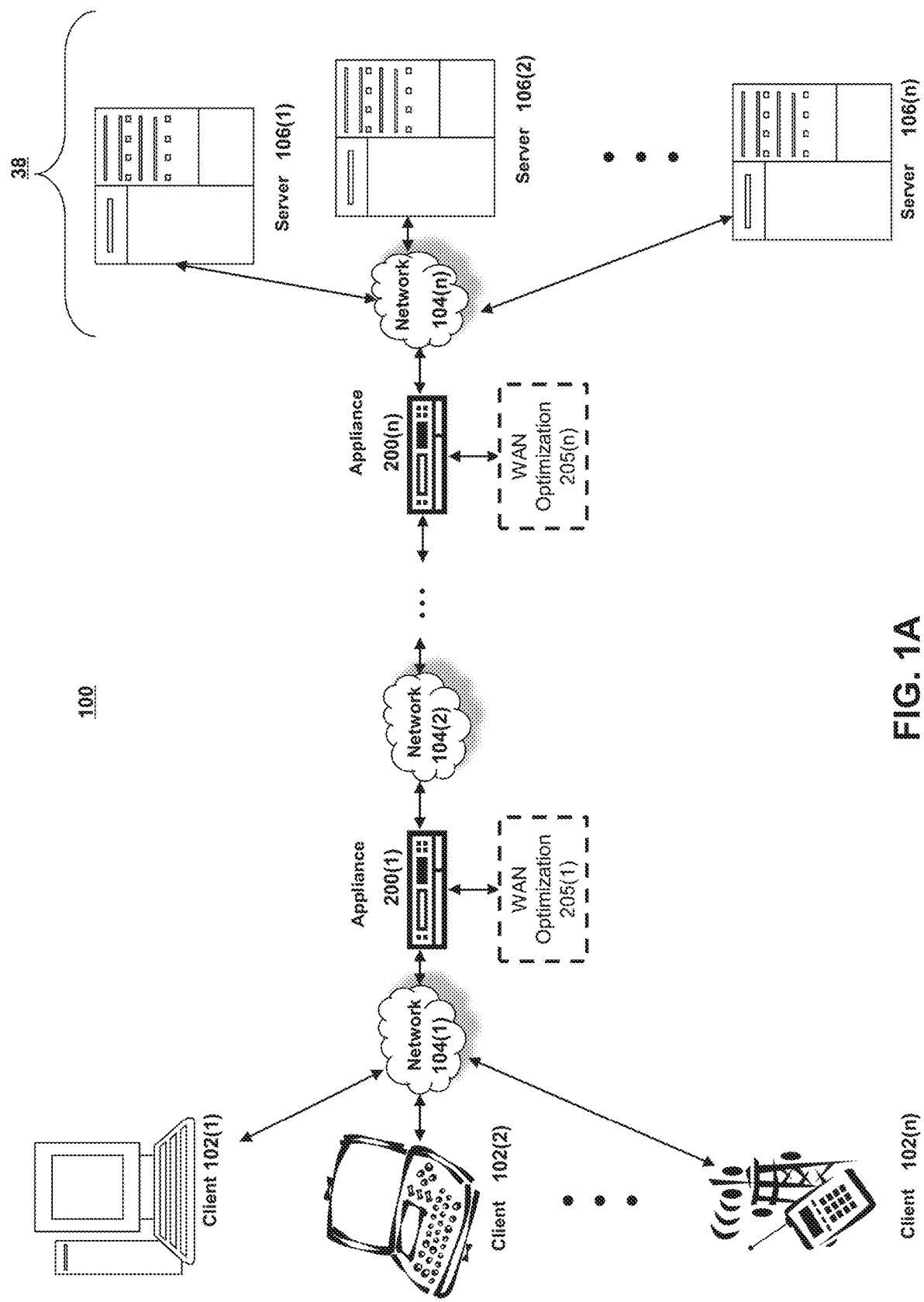
FIG. 1A is a block diagram of a network computing system, in accordance with an illustrative embodiment.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for establishing context secure connection using routing tokens.

A. Network and Computing Environment

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as CloudBridge® products sold by Citrix Systems, Inc. of Fort Lauderdale, Fla.

Figure 1B:
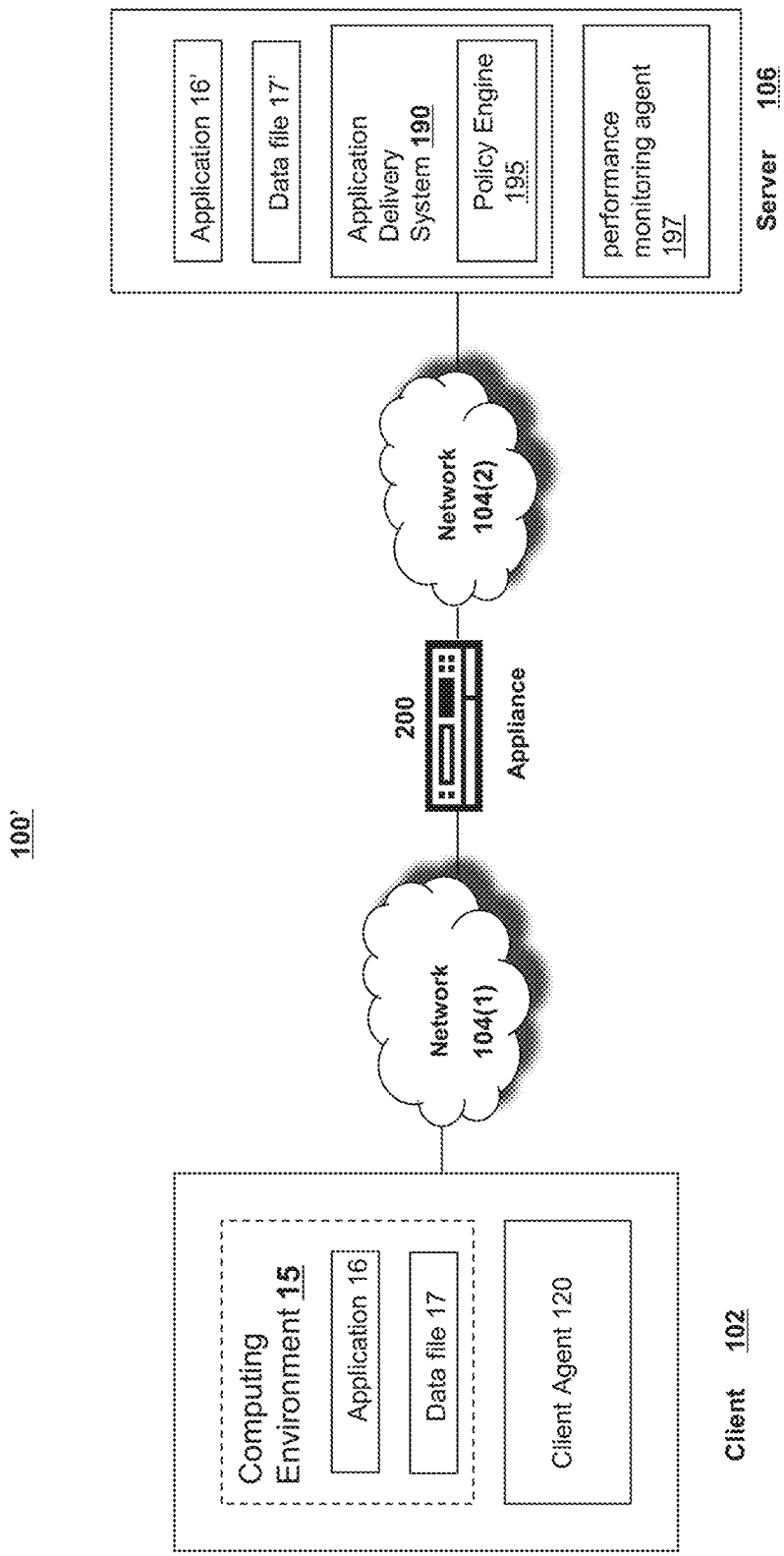
FIG. 1B is a block diagram of a network computing system for delivering a computing environment from a server to a client via an appliance, in accordance with an illustrative embodiment.

Referring to FIG. 1B, an example network environment 100' for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17, 17'. Computing environment 15, application 16 and/or data file 17, 17' may be delivered to the client 102 via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 50 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
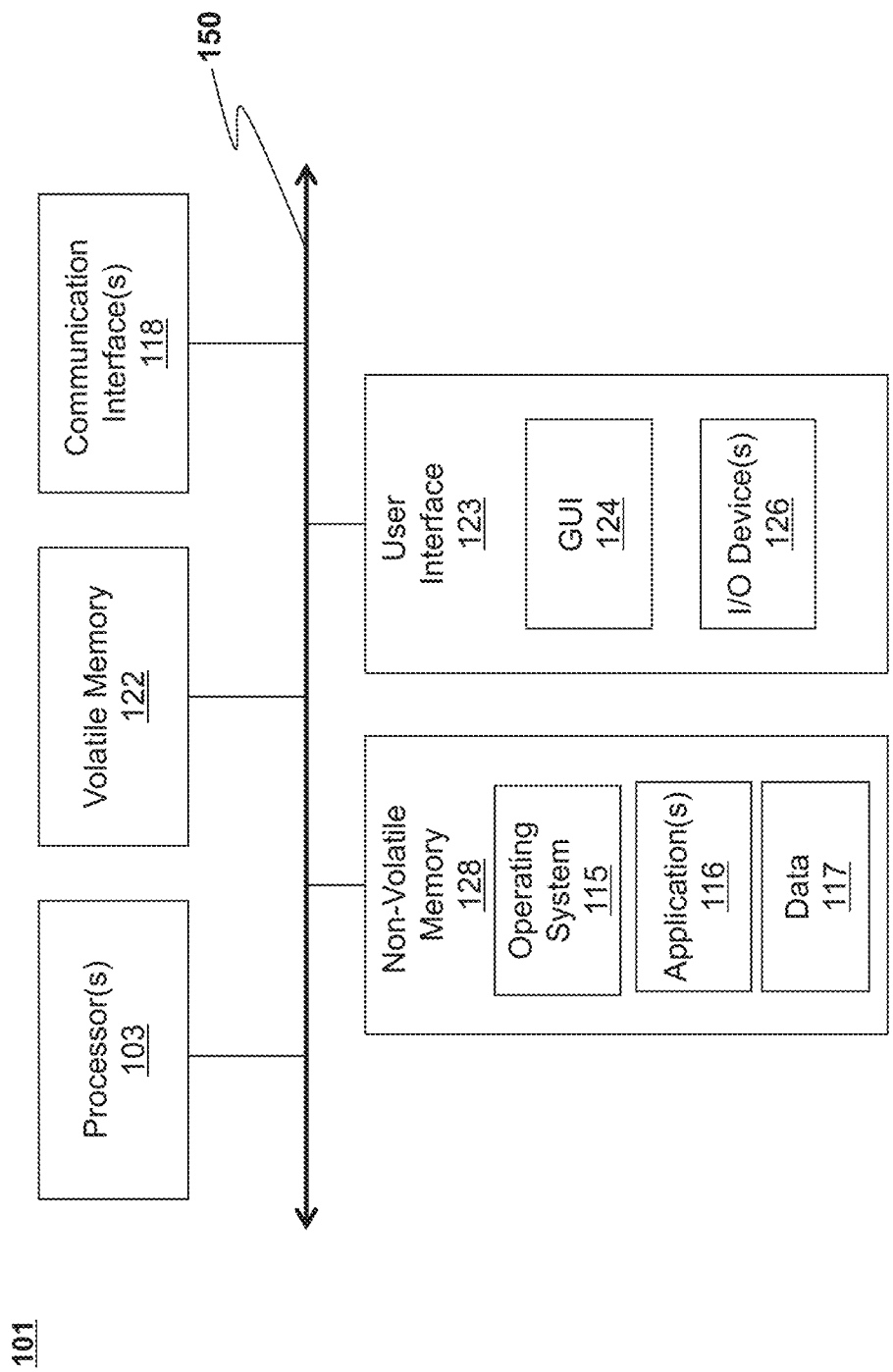
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

B. Appliance Architecture

Figure 2:
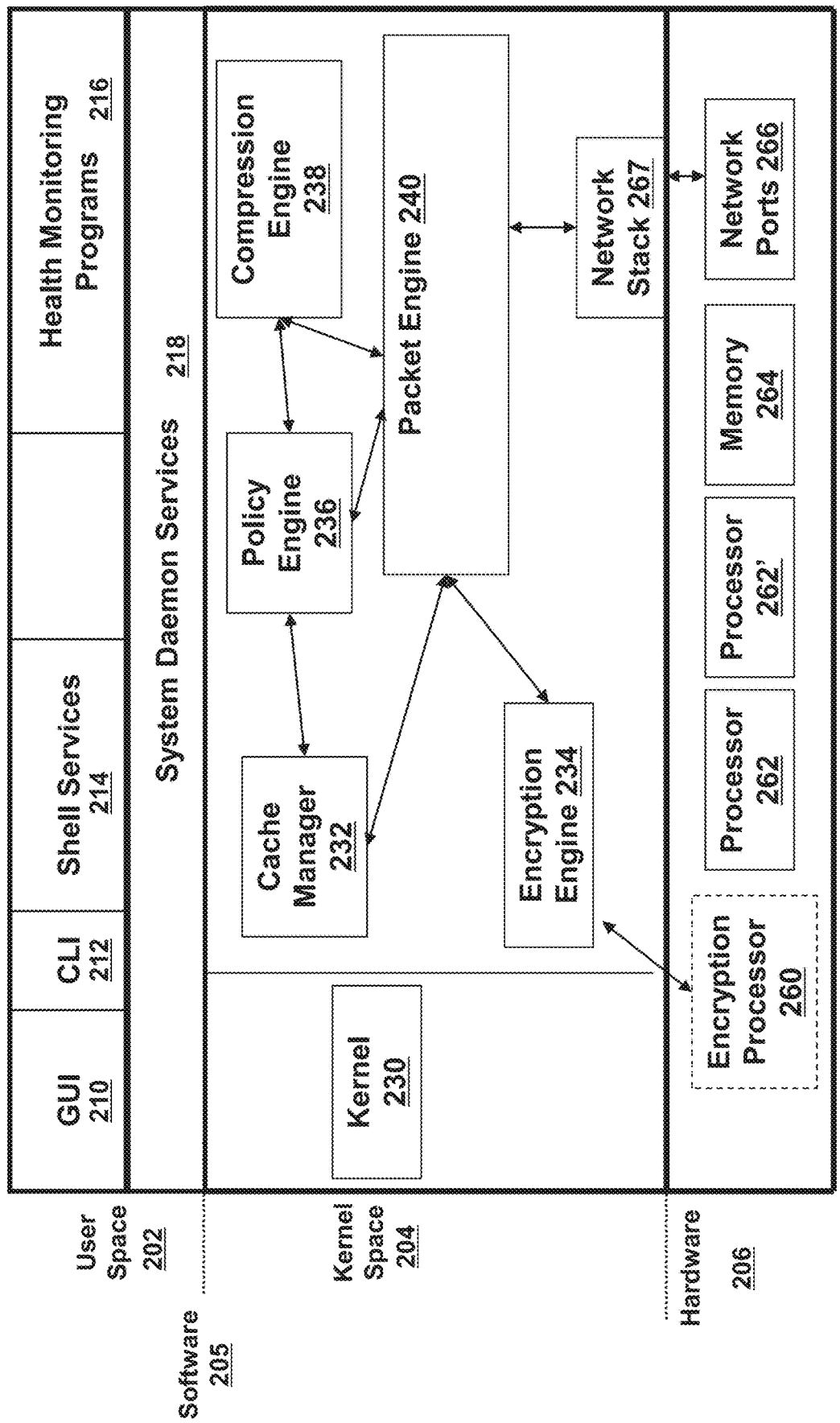
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262, 262' for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reduce the access time of the data. In some embodiments, the cache manager 232 may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine whether a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, Fla., the teachings of which are hereby incorporated herein by reference.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, Fla.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
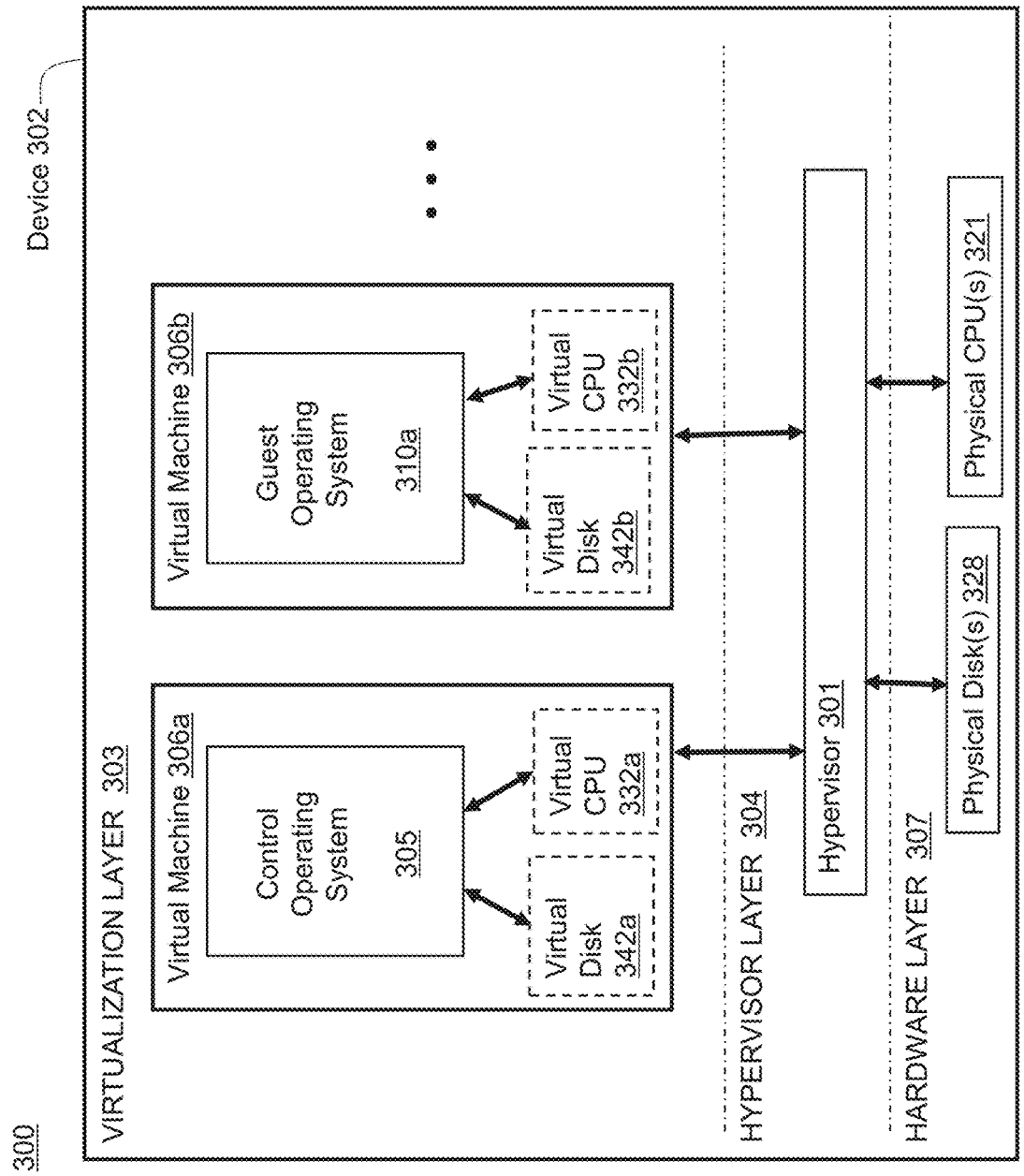
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hash values from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, Fla., the teachings of which are hereby incorporated herein by reference.

D. Systems and Methods for Providing a Distributed Cluster Architecture

Figure 4:
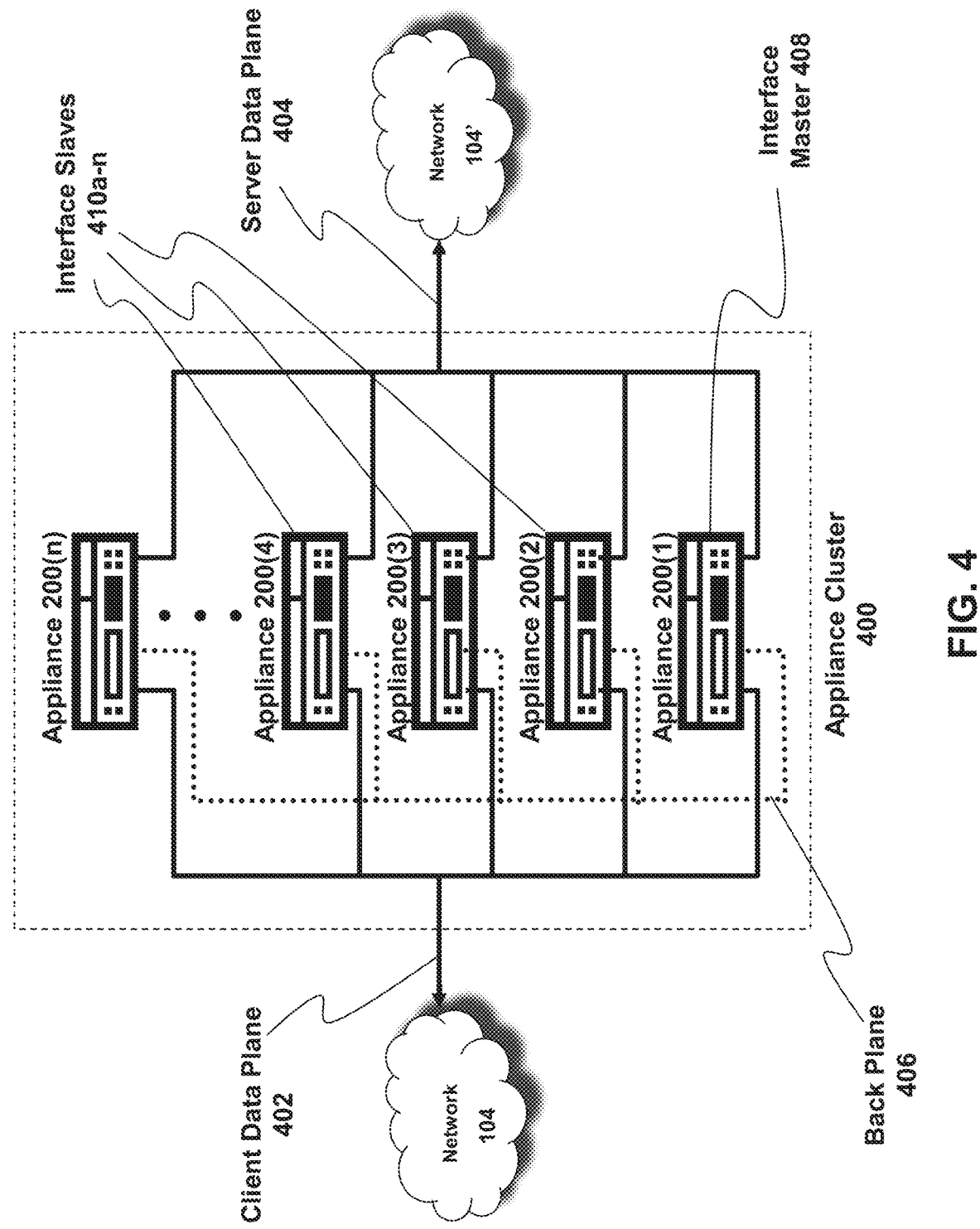
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance [[if]] of the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a client-side network 104 via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104' via server data plane 404. Similar to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or backplane 406. Backplane 406 may enable inter-node or inter-appliance control and configuration messages, for inter-node forwarding of traffic, and/or for communicating configuration and control traffic from an administrator or user to cluster 400. In some embodiments, backplane 406 may be a physical network, a VPN or tunnel, or a combination thereof.

Still referring to FIG. 4, an appliance cluster 400 may be connected to a network via a client data plane 402. In some embodiments, client data plane 402 may comprise a communication network, such as a network 104, carrying data between clients and appliance cluster 400. In some embodiments, client data plane 402 may comprise a switch, hub, router, or other network devices bridging an external network 104 and the plurality of appliances 200 *a*-200 *n* of the appliance cluster 400. For example, in one such embodiment, a router may be connected to an external network 104, and connected to a network interface of each appliance 200 *a*-200 *n*. In some embodiments, this router or switch may be referred to as an interface manager, and may further be configured to distribute traffic evenly across the nodes in the application cluster 600. Thus, in many embodiments, the interface master may comprise a flow distributor external to appliance cluster 400. In other embodiments, the interface master may comprise one of appliances 200 *a*-200 *n*. For example, a first appliance 200 *a* may serve as the interface master 408, receiving incoming traffic for the appliance cluster 600 and distributing the traffic across each of appliances 200 *b*-200 *n*. In some embodiments, return traffic may similarly flow from each of appliances 200 *b*-200 *n* via the first appliance 200 *a* serving as the interface master 408. In other embodiments, return traffic from each of appliances 200 *b*-200 *n* may be transmitted directly to a network 104, 104', or via an external router, switch, or other device. In some embodiments, appliances 200 of the appliance cluster not serving as an interface master may be referred to as interface slaves 410A-410N.

Additional details of cluster 400 may be as described in U.S. Pat. No. 9,538,345, issued Jan. 3, 2017 to Citrix Systems, Inc. of Fort Lauderdale, Fla., the teachings of which are hereby incorporated herein by reference.

E. Systems and Methods for Establishing a Secure Connection Using Routing Tokens As a brief overview, this disclosure is directed to systems and methods for securing a connection using routing tokens. Some embodiments of cloud services may have a design including a node which provides or delivers a service to a client (generally referred to herein as "service node"). The service may execute on a server. In some implementations, multiple components and nodes (collectively referred to as "network devices") are located between the client and server. For instance, a number of flow redirectors (e.g., both on the client-side and server side), a number of proxy nodes, service nodes, etc., may be located between the client and server. As such, for a service to be delivered to client, the appropriate network path between the service and proper service node has to be established. In some embodiments, establishing the appropriate network path may cause a delay in delivery of the service. For instance, given the number of network devices and potential network paths, it may require further network resources for establishing, identifying, or otherwise determining the appropriate network path. Such instances may thus cause a delay in delivery of resources or services to the client, which may decrease user experience and satisfaction. Further, such instances may call for re-allocation of network resources (otherwise useful for other important tasks or activities) towards determining the appropriate network path, which may for instance result in delay in or interruption of network access or other network issues.

According to the aspects described herein, the network path between the client and server is established by supporting a rendezvous connection towards the service node. For instance, in such deployments and embodiments, when a client connects to a service node for requesting access to a service, the service node does not initiate a connection towards the server hosting the service directly. Rather, the server, through multiple flow redirectors and proxies, initiate the connection towards the service node. According to the aspects described herein, the path between a server and a service node can be established using routing tokens valid on each corresponding one of the network devices (or nodes). For instance, the server may deliver a plurality of routing tokens to each of the network devices between the server and service node. The network devices may identify their routing token, identify the next node in the network path (based on information from the routing token), pass the remaining routing tokens to the next node, and so forth, until each node receives their respective routing token. Such embodiments may expedite the determination and/or establishment of the network path between the service node and server.

In some implementations, an end-to-end cryptographic context may be directly established and negotiated between the server and the service node along the network path identified using the routing tokens. An end-to-end cryptographic context can refer to a cryptographic context that extends (e.g., is shared) between a sender (or source) and recipient (or destination) of traffic. An end-to-end cryptographic context can be configured such that the traffic is not decrypted by any of the intermediary nodes along the service path. The server may send a token which is valid on the service node separate from the routing token(s) following establishment of the end-to-end crypto context, over the secure channel between the service node and server along the service path identified by routing tokens, and/or after establishment of the service connection, through the network devices via the routing tokens, between the service node and server. The service node and/or server may validate the connection and/or each other. The token valid on (e.g., to be validated by) the service node is sent separately over the secure channel, only after end-to-end crypto context is established between server and service node, and/or after the service connection is established between server and service node. The token on service node would further validate the service connection and the token might also help the service node in connecting to the appropriate client.

Such embodiments improve the speed and efficiency at which the network path between the service node and server can be determined in comparison to systems which do not use the disclosed systems and methods. In implementations which do not include at least some of the aspects described herein, it may be difficult to establish the service connection between a server and service node. For instance, where multiple network paths are possible through various network devices, identifying the specific network path (including the corresponding subset of network devices) may require increased and significant processing and computing resources, relative to embodiments of the solutions using routing tokens and/or an end-to-end cryptographic context. For instance, the client may be required to store the service connection (including information about the corresponding network devices) for each potential server hosting services which are accessible by the client, which takes up storage resources on the client for instance. Such embodiments may significantly consume or deplete computing resources for the client. Alternatively, the client and/or service node may identify the network path through a "guess-and-check" (or trial-and-error) approach, which may result in delayed access to services and/or increased consumption of computing resources (e.g., transmission bandwidth and/or computing/processing resources). Also, in some deployments, for every connection, it might be necessary to establish intermediary cryptographic contexts between a service node and a network device and/or between network devices and/or between a network device and/or the service node, along the network path between the server and the service node, which may result in delayed access to services and/or increased consumption of computing resources (e.g., transmission bandwidth and/or computing/processing resources). The present disclosure improves on such implementations by establishing a rendezvous point at the service node, which expedites the identification of the network path and corresponding delivery of content from the service to the client. Furthermore, through use of the routing tokens, the network path between the client device and server is quickly established at the rendezvous point (e.g., service node) at both end points (client to service node, and server to service node).

For implementations that do not establish or use an end-to-end cryptographic context, data or packets are decrypted at each node along a network path between a sender and an intended recipient. Each node decrypts the received packet, re-encrypts the packet, and delivers the packet to the next node. Such embodiments cause an increased consumption of computing resources and may result in increased vulnerability of the packet (e.g., decrypted information from the packet may be intercepted by a third party). The present disclosure improves on such implementations by securing packets sent from sender to the intended recipient throughout the network path. Each node along the network path passes the packet to the next node (e.g., rather than decrypting, identifying the next node, re-encrypting, and transmitting the packet). According to such embodiments, packets are more secure in comparison to packets which are not transmitted using an end-to-end cryptographic context. Further, such embodiments lessen computing resources at each intermediate node by eliminating the decrypting/identifying/re-encrypting/transmitting operation(s) performed by each intermediate node between sender and recipient.

Described herein are systems and methods for establishing a secure connection using routing tokens. Various network devices can be located intermediary between a service node and a server. Routing tokens can be provided to the network devices located along the network path between the service node and server, to specify or map out a network path for the secure connection. In some embodiments, the routing tokens are provided in or with an initial packet containing cryptographic context negotiation handshake protocol information (for instance, Secure Socket Layer (SSL) client hello, Datagram Transport Layer Security (DTLS) client hello, etc.). Each network device located along the network path identifies, reads, and/or validates their corresponding applicable routing token. The network devices can identify the next network device (also referred to herein sometimes as "node") along the network path, and pass the initial packet to the next network device. Such steps can be performed at each node along the network path between the service node and server. The server and service node can negotiate a cryptographic context, which may be an end-to-end cryptographic context. Following establishment of the cryptographic context between the server and service node, the server may provide a service node routing token for the service node over the secure channel established via the cryptographic context. The service node may use the service node routing token to identify the client connection. Such embodiments may facilitate, expedite and simplify identification and/or establishment of the proper connection along a specified network path between the client and server, thus limiting the amount of computer resources needed to support or provide the service connection.

Various network devices, such as flow redirectors and proxy nodes, may be located intermediary between the service node and service. Routing tokens may be issued for each network device located along the network path for a given connection path between a client and server hosting a service. In some embodiments, the routing tokens may be valid for a particular interval of time. In some embodiments, the routing tokens may be valid for one-time use, hence avoiding replay attack on the service node for instance, when the connection from the server can reach the service node only through the intermediary network devices along the service path. In some embodiments, a plurality of network devices may use the same routing token (e.g., a first and second network device may use the same routing token). Such routing tokens may be provided to the server from, for instance, cloud-based controllers or processors, or other external devices which are communicably coupled to the server.

The client may communicate a request to access a service to the service node. Responsive to receiving the request, the service node may communicate connection information (e.g., corresponding to the service node and/or client), routing tokens, etc., to the cloud-based controller. The cloud-based controller may then provide the routing tokens (e.g., for both the network devices and the service node) to the server.

Once the server receives the routing tokens from the cloud-based controller, the server may initiate a connection towards the service node (e.g., through the network device(s) intermediary between the server and service node) based on the information received from the cloud-based controller.

The server may initiate negotiation of a cryptographic context between the adjacent network device (or directly with the service node) by providing a packet containing handshake information (also referred to herein as "initial handshake packet"), such as SSL/DTLS/etc. protocol handshake information. In some embodiments, the routing tokens for each of the network devices between the server and service node may be sent separate from (e.g., prior to, concurrently with, or subsequent to) the initial handshake packet. In some embodiments, the routing tokens for the network devices may be provided with the initial handshake packet. In such embodiments, the server may provide the initial handshake packet with the routing tokens to the first network device along the service connection. The first network device may read the routing token corresponding thereto, validate the routing token, identify the second network device, and pass the initial handshake packet to the second network device. In some embodiments, the first network device may strip, delete, remove, or otherwise extract the routing token for the first network device from the initial handshake packet. In such embodiments, the initial handshake packet received by the second network device may include each of the routing tokens except for the routing token for the first network device. In some embodiments, such as those where a routing token is conveyed to or passed through multiple network devices, the routing token may be removed by the last network device which uses the routing token, by the n-th network device adjacent to the service node, etc. The second network device may read the routing token corresponding to or designated for the second network device, validate the routing token, identify the third network device, and pass the initial handshake packet to the third network device. Such steps may be performed by each network device along the network path between the server and service node. Each of the routing tokens may be used for establishing, identifying, or otherwise determining the service connection between the server and service node. In each of these embodiments, the service node receives the initial handshake packet from the n-th network device without any routing tokens.

In some embodiments, following the network devices receiving and reading their corresponding routing tokens and thus establishing the service connection along the network path between the server and service node, the service node and server may directly negotiate the cryptographic context along the network path identified using the routing tokens. In some embodiments, the service node may validate the server and/or service. For instance, where the initial handshake packet includes information for validating the server and/or service, the service node may validate the server and/or service based on such information. The service node might validate the server/service during negotiation of cryptographic context, where the information for validating the server/service can be obtained by the service node through initial packets from client or by other means. Similarly, the server and/or service may validate the service node during negotiation of the cryptographic context. For instance, the server and/or service may validate the service node through information received from the cloud-based controller. The cryptographic context between the server and service node may provide a secure channel (via the service connection) for exchanging data between the server and service node.

Following negotiation of the cryptographic context between the service node and server along the network path identified using the routing tokens, the server may provide, to the service node, a routing token for the service node (sometimes referred herein as "service node routing token"). The routing token for the service node may be communicated across the secure channel along the network path. In some embodiments, the service node authenticates the server and/or validates the secure channel based on the routing token. In some embodiments, the service node identifies a connection with the client based on the routing token for the service node. Following establishment (and, in some implementations, validation) of the secure channel, data traffic may be exchanged across the secure channel between the service node and server. The data traffic may be routed, provided, or otherwise delivered to the client via a local cryptographic context established between the service node and the client.

Figure 5:
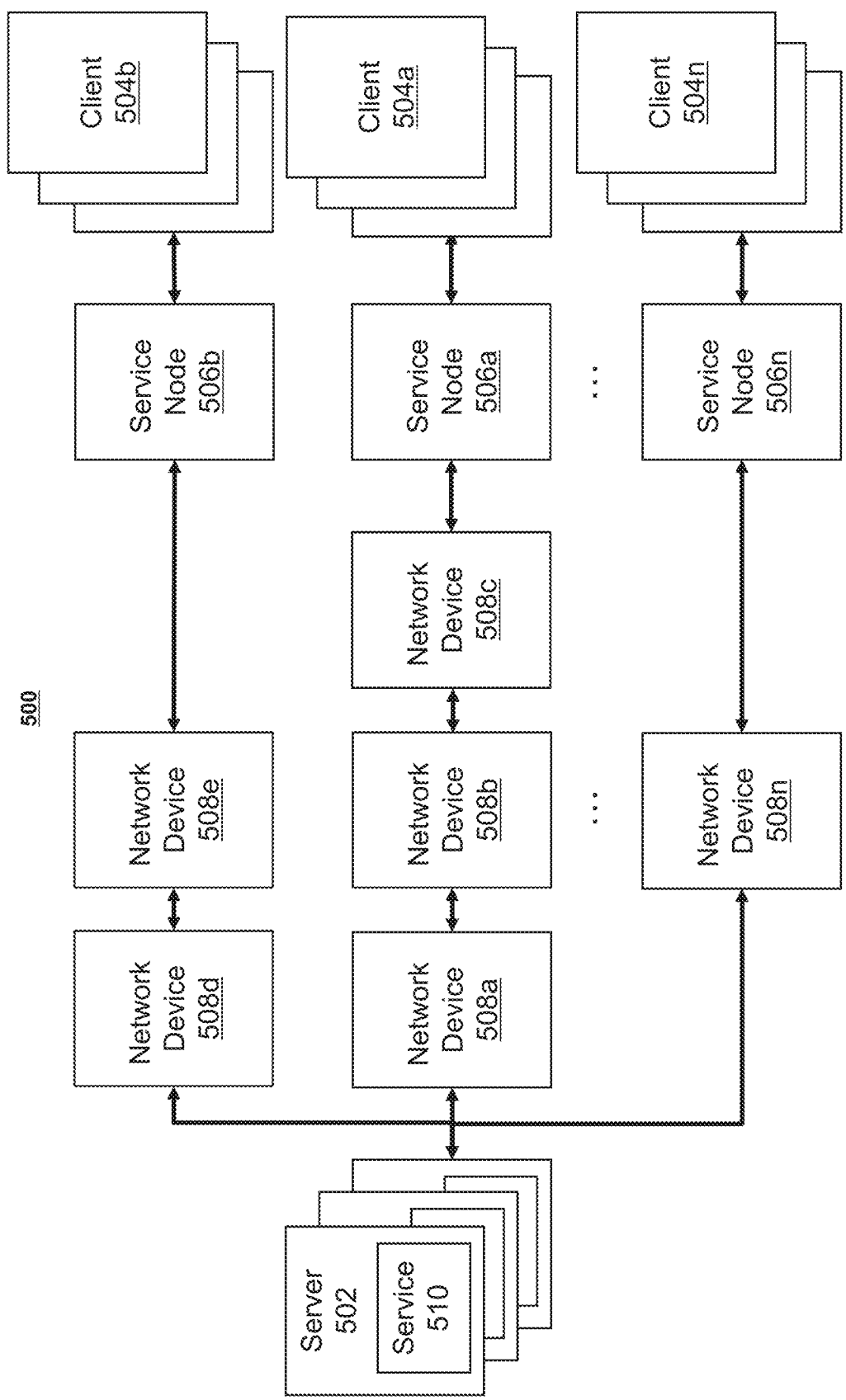
FIG. 5 is a block diagram of one example of a computing environment system, according to an illustrative embodiment.

Referring now to FIG. 5, depicted is one example of a computing environment system 500, according to an illustrative embodiment. In overview, the system 500 may include one or more servers 502 (referred to as server 502) which host a respective service 510 (or services), a plurality of clients 504a-504n (sometimes referred to as client 504 or clients 504), a plurality of service nodes 506a-506n (sometimes referred to as service node 506 or service nodes 506), and/or a plurality of network devices 508a-508n. Each of the service nodes 506a-506n may be configured to exchange data (e.g., corresponding to the service 510) with a client 504 (or a group or subset of clients 504). For instance, a first service node 506a may be configured to exchange data with a first group of clients 504, a second service node 506b may be configured to exchange data with a second group of clients 504, and so forth. The network devices 508a-508n may be situated intermediary between the server 502 and service nodes 506. Subsets of the network devices 508a-508n may be arranged along respective service connections between a server 502 and service nodes 506a-506n. For instance, as shown in FIG. 5, network devices 508a-508c are arranged along a network path intermediary between the server 502 and service node 506a, network devices 508d, 508e are arranged along a different network path intermediary between the server 502 and service node 506b, and network device 508n is arranged along another network path intermediary between the server 502 and service node 506n. In some embodiments, various network devices 508 may be situated or shared along multiple service connections. For instance, a network device 508 may be arranged along a service connection to both the first and second service nodes 506a, 506b.

In some embodiments, various network paths may be used for exchanging data between a given server 502 and a given client 504. Subsets of the network devices 508a-508n may be arranged along the network paths. Hence, for a given client 504 to exchange data with a server 502 which hosts or otherwise executes a particular service 510, a subset of the network devices 508a-508n (and the service node 506) may be arranged along the service connection between the client 504 and server 502 and can pass the data between the server 502 and client 504.

Figure 6:
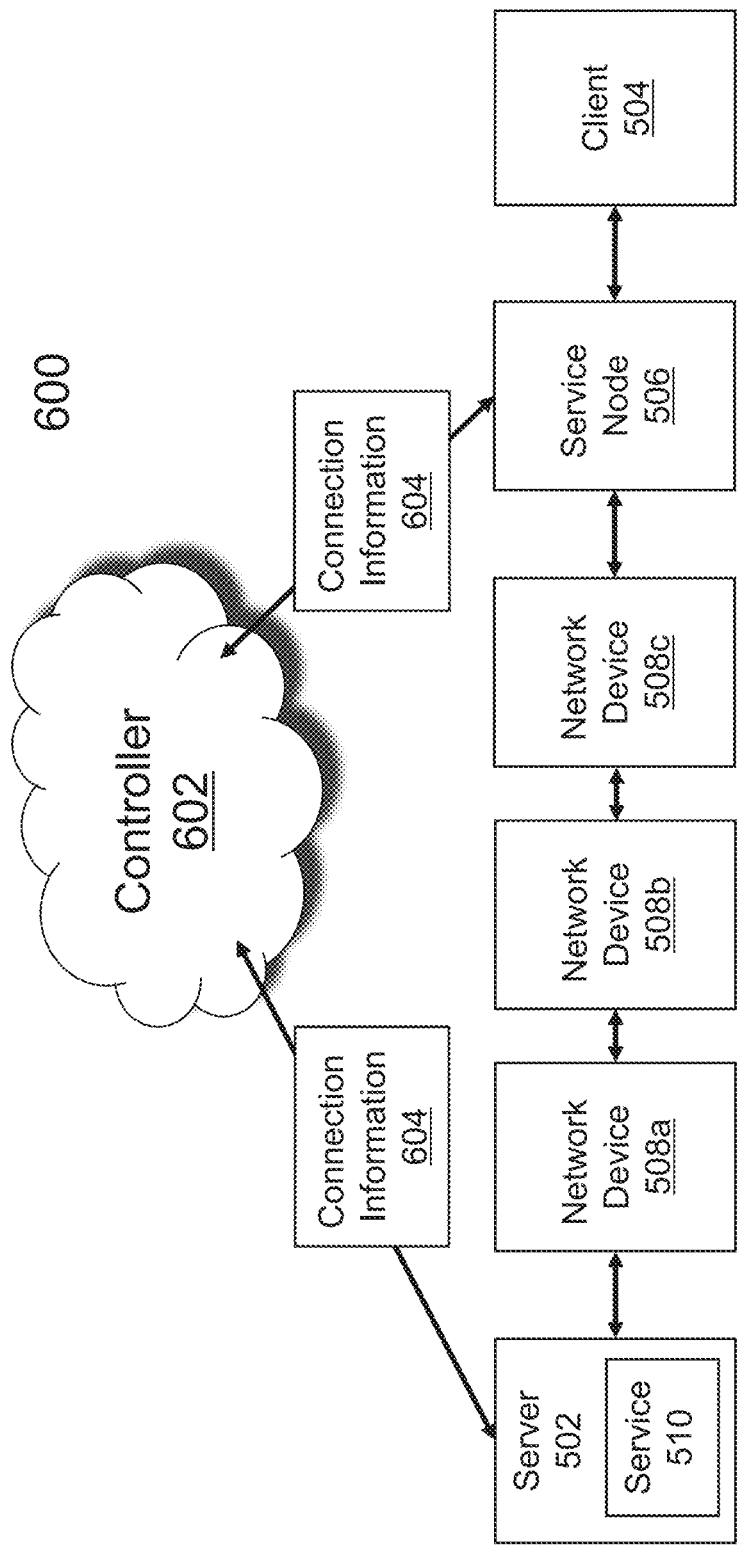
FIG. 6 is a block diagram of a system for establishing a secure connection, according to an illustrative embodiment.

Referring now to FIG. 6, depicted is a system 600 for establishing a secure connection, according to an illustrative embodiment. The system 600 is shown to include a controller 602, and/or other entities discussed herein. In some embodiments, the controller 602 may be a cloud-based controller 602 (e.g., executing on one or more servers within a cloud or network of servers). In some instances, a particular client 504 (such as client 504a) may request access to a particular service 510 executing on a respective server 502. In implementations which do not include at least some of the aspects described herein, it may be difficult to establish a secure channel between the client 504 and server 502 hosting and executing the requested service 510. For instance, where multiple network paths are possible through various network devices 508, identifying the specific network path (including the corresponding subset of network devices 508) may require increased and significant processing and computing resources, relative to embodiments of the solutions using routing tokens and/or an end-to-end cryptographic context. For instance, the client 504 may be required to store the service connection (including corresponding network devices 508) for each potential server hosting services 510 which are accessible by the client 504, which takes up storage resources on the client 504 for instance. Such embodiments may significantly consume or deplete computing resources for the client. Alternatively, the client 504 and/or service node 506 may identify the network path through a "guess-and-check" (or trial-and-error) approach, which may result in delayed access to services 510 and/or increased consumption of computing resources (e.g., transmission bandwidth and/or computing/processing resources). And for implementations that do not establish or use an end-to-end cryptographic context, data or packets are decrypted at each node along a network path between a sender and an intended recipient. Each node along the network path decrypts the packet, re-encrypts the packet, and delivers the packet to the next node. Such embodiments cause an increased consumption of computing resources and may result in increased vulnerability of the packet (e.g., since decrypted information from the packet may be intercepted by a third party).

Referring to FIG. 6 for instance, the client 504a may be configured to request access to a service 510 executing on a server 502. The service node 506a corresponding to the client 504a may be configured to receive the request from the client 504a. The service node 506a may be configured to provide connection information 604 to the controller 602 in some cases, which may then be routed to the server 502 hosting the service 510. The connection information 604 may include one or more routing tokens for the network devices 508 located along the network path between the server 502 and service node 506a, identification information (e.g., network address) corresponding to the client 504a, identification information corresponding to the service node 506a, and/or a routing token for the service node 506a, among other information. In some embodiments or cases, the service node routing token can be generated by the service node and the routing tokens for intermediary devices can be generated by the controller 602. In some embodiments or cases, routing tokens can be generated by the controller 602 itself using the service node connection information received by the controller 602 from the service node 506 and/or the network device(s) 508. The connection information from the service node 506 to the controller 602 may include client details for generating the service node routing token on the controller 602. In some embodiments or cases, all the routing tokens can be generated by the service node 506 itself using information received through the client 504 and/or using information obtained from the controller 602 or network device(s) 508 or other means.

The server 502 may be configured to communicate the routing tokens towards each of the network devices 508 arranged along the service connection between the service node 506*a* and server 502, by using connection information 604 in the routing tokens. The server 502 may be configured to communicate the routing tokens for the network devices 508 with handshake data for negotiating a cryptographic context between the server 502 and service node 506*a*, or the server 502 may be configured to communicate the routing tokens for the network devices 508 separate from (e.g., prior or subsequent to, or in different packet(s) for) the handshake data. Each of the network device 508 located along the service connection may be configured to receive a packet containing their respective routing token (e.g., from the server), read and validate their respective (e.g., correspondingly pre-assigned) routing token, identify the next network device 508, and pass the packet to the next network device 508. The routing tokens may be configured to be used by the respective network devices 508 and service node 506 to identify, define and/or establish the proper network path between the service node 506 and server 502 (also sometimes referred to herein as service connection). The handshake data may be used for establishing a secure channel between the service node 506 and server 502 through the network devices 508 through, via or along the service connection's network path. Following establishment of the secure channel, the routing token for the service node 506 may be communicated by the server 502 to the service node 506 via or across the secure channel. The service node 506 may use the routing token for validating the secure channel, authenticating the server 502, and/or identifying the proper client 504. Following the service node 506 receiving the routing token, network traffic corresponding to the service 510 may be exchanged between the service node 506 and server 502. The systems and methods of the present solution may be implemented in any type and form of device, including clients, servers and/or appliances 200 described above with reference to FIG. 1A-FIG. 1B, FIG. 2 and FIG. 4. As referenced herein, a "server" may sometimes refer to any device in a client-server relationship, e.g., an appliance 200 in a handshake with a client device 102. The server 502 may be an instance, implementation, or include aspects similar to server 106*a-n* described above with reference to at least FIG. 1A. Similarly, the client 504 may be an instance, implementation, or include aspects similar to any of the clients 102 *a-n* described above with reference to FIG. 1A. The present systems and methods may be implemented in any intermediary device or gateway, such as any embodiments or aspects of the appliance or devices 200 described herein. Some portion of the present systems and methods may be implemented as part of a packet processing engine and/or virtual server of an appliance, for instance. The systems and methods may be implemented in any type and form of environment, including multi-core appliances, virtualized environments and/or clustered environments described herein.

The server 502 may host one or more services 510. Each of the services 510 can include or correspond to any type or form of application or service. The application or service may include a network application, a web application, a Software-as-a-Service (SaaS) application, a remote-hosted application, desktop service or application, and so on. As some non-limiting examples, an application can include a word processing, spreadsheet or other application from a suite of applications (e.g., Microsoft Office360, or Google docs), an application hosted and executing on a server for remote provisioning to a client, and/or a HTML5-based application. Packets corresponding to service(s) 510 may be encrypted/unencrypted by the server 502 and transmitted or delivered to the client 504.

In some embodiments, the client 504 may reside at a branch office and may operate within a client-side network, which may include or correspond to a private network (e.g., a local area network (LAN) or wide area network (WAN)) between or spanning the client 504 and client-side network device(s) 508. In some embodiments, the server 502 and the client 504 may be communicably coupled to one another via a private network (e.g., a LAN or a software-defined wide area network (SD-WAN)). The server 502 (and service node 506 and/or at least some of the network devices 508) may reside at a server or data center (e.g., in the cloud), and may operate within a server-side network, which may also be a private network (e.g., a LAN, WAN, etc.).

A network device 508*a-n* can include or correspond to any type or form of intermediary device, network device or appliance, flow redirector device, gateway device, middle box device and/or proxy device, such as but not limited to a NetScaler device, SD-WAN device, and so on. As described in greater detail below, each (or at least some) of the server 502, client 504, network device(s) 508, and service node 506 may be communicably coupled in series. In some embodiments, each of the server 502, network device(s) 508, and service node 506 may share a cryptographic context with an adjacent (e.g., paired) component or device. Such a cryptographic context may be similar to one another, or may be different from other cryptographic contexts. In some embodiments, the service connection may not have any intermediary cryptographic contexts along the service path, or may have intermediary cryptographic contexts between some selective nodes within the service path, or may have intermediary crypto contexts between all the nodes with in the service path, depending on the deployment.

In some embodiments, creation of intermediary cryptographic contexts along the service path is avoided completely, hence providing improved initial connection establishment time. For example, the creation of intermediary cryptographic contexts can be avoided by using the one-time valid routing tokens, hence providing improved initial connection establishment time, and avoiding increased consumption of computing resources (e.g., transmission bandwidth and/or computing/processing resources).

The service node 506 may reside or be intermediary between the network device(s) 508 and the client 504, and can reside anywhere in the cloud or a network. The service node 506 may be configured to execute, support and/or facilitate various functions corresponding to traffic between the server 502 (e.g., relating to the service 510) and the client 504, such as functions to provision the service 510 from the server 502 to the client 504, for instance. As described in greater detail below, the service node 506 may generally be configured to receive a request from a client 504 for a service 510, communicate connection information to the controller 602, receive routing token(s) from the server 502 across a secure channel, and pass traffic between the server 502 and client 504 via respective secure channels.

The controller 602 may be or include a cloud-based controller 602. The controller 602 may be similar in at least some aspects to computer 101 described above with reference to FIG. 1C. The controller 602 may be communicably coupled to various service nodes including service node 506 as shown in FIG. 6. The controller 602 may be communicably coupled to various servers including server 502 as shown in FIG. 6. The controller 602 may communicably couple to the service node 506 and server 502 across a respective network, such as a Local Area Network (LAN), Wide Area Network (WAN), etc. The controller 602 may be configured to receive data from the service node 506*a*, and provide corresponding data to the server 502.

The service node 506 may be configured to provide connection information 604 to the controller 602. Hence, the controller 602 may be configured to receive connection information 604 from the service node 506. The service node 506 may be configured to provide the connection information 604 to the controller 602 responsive to receiving a request from the client 504 to access a service 510 hosted on the server 502. The connection information 604 may correspond to the request received by the service node 506 from the client 504. The connection information 604 may identify the requested server 502, identify the requested service 510 executing on the server 502, identify the client 504, and/or identify the service node 506, and so forth. Generally speaking, the connection information may be configured to be used for identifying the specific network path between a server 502 executing a requested service 510 and a client 504 through a corresponding service node 506 and network device(s) 508.

The service node 506, server 502 and/or controller 602 may be configured to assemble, build, construct, or otherwise generate a plurality of routing tokens corresponding to the network path between the server 502 and service node. For instance, the server 502 may be structured to store various network paths to registered clients including client 504. The server 502 may be configured to generate the routing tokens corresponding to the network path between the server 502 and service node 506 when the service node 506 provides the server 502 (e.g., directly or through the controller 602) with connection information. As another illustrative example, the service node 506 may be configured to generate the routing tokens based on the nodes located along the network path. Each of the nodes may be associated with a respective routing token. The service node 506 may be configured to generate the routing tokens based on information corresponding to the nodes. Some of the plurality of routing tokens may be uniquely associated with network devices 508 (also referred to herein as network device routing tokens) along a certain network path. In some embodiments, some of the network device routing tokens may be uniquely associated with a plurality of network devices 508 (e.g., one network device routing token may be uniquely associated with two or more network devices 508). One of the routing tokens may be uniquely associated with the service node 506 (also referred to herein as the service node routing token). The routing tokens may be structured as or be included in one or more packets. For instance, the connection information may include or correspond to (or be partitioned between) a packet containing, at least, the network device routing tokens, and a packet containing the service node routing token. In some embodiments or cases, the routing tokens can be generated by the controller 602 itself using the service node connection information 604 received from the service node 506 and/or the server/service requested for access.

In some embodiments, the routing tokens may be valid for a predetermined duration of time. The predetermined duration of time may be or correspond to a timeout (e.g., a number of minutes, seconds, etc.). The timeout may be a timeout duration corresponding to establishing the service connection, a timeout duration for negotiation of a cryptographic context, etc. The predetermined duration of time may be stored locally on the service node 506. In some implementations, the predetermined duration of time may be based on the service connection. For instance, for longer service connections (e.g., service connections having a greater number of nodes), the predetermined duration of time may be greater than shorter service connection. As another example, the predetermined duration of time may be different for each or some of the nodes along the service connection (e.g., the predetermined duration of time is increased as nodes are located farther downstream from the server 502).

Each packet provided by the service node 506 (and communicated or otherwise exchanged through the network) to the controller 602 may include header information and a payload. The header information and the payload of each packet may be generated in accordance with any number of communication protocols at any network stack layer, such as: an Application Layer protocol (e.g., HyperText Transfer Protocol (HTTP), Common Internet File System (CIFS), Messaging Application Programming Interface (MAPI)), a Transport Layer protocol (e.g., Transmission Control Protocol (TCP) and User Datagram Protocol (UDP)), and a Network Layer protocol (e.g., Internet Protocol (IP), Internet Protocol Security (IPsec), and Datagram Delivery Protocol (DDP)), among others. The network stack layer can include any of the layers in the Open Systems Interconnection (OSI) model or the Internet protocol suite.

The header information of the packet may also be generated in accordance with any number of communication protocols at any network stack layer. In some embodiments, the header information for a packet generated in accordance with a Transport Layer (or layer 4 or L4 according to the OSI model) protocol may include Transport Layer header information. In some embodiments, the header information for a packet generated in accordance with a Network Layer (or layer 3 or L3) protocol may include Network Layer header information. In some embodiments, the header information for a packet generated in accordance with an Application Layer protocol may include Application Layer header information. In general, the header information of the packet may include a source address, a source port, a destination address, a destination port, a session identifier, a protocol number, one or more options, and/or a checksum, among others. The source address or source port may correspond to the service node 506. The destination address or destination port may correspond to the server 502. The header information may include one or more header fields (e.g., of HTTP protocol) as specified by the communication protocol.

The header information of the packet may also include metadata. In some embodiments, the metadata of the header information of the packet may be associated with the information contained in the packet (e.g., the routing tokens). The metadata may include, for example, an indicator specifying that the packet contains routing tokens. The metadata may also include other connection information such as, for instance an identifier for or associated with the client 504 (e.g., including or corresponding to a user profile, email address, or screenname), a service 510 identifier (e.g., a name of the service 510), a profile of the service 510 (e.g., a version number of the service 510), and a timestamp corresponding to generation of the packet, among others.

The payload and/or header of the packet may include the routing tokens, which may be generated by the service node 506 (or other device configured to generate the routing tokens). The routing tokens may be individual packets of data (or other forms of structured data) which are uniquely associated with a particular device, such as a particular network device 508 (or group of network devices 508) and the service node 506. The routing tokens may be configured to define the network path of the service connection between the service node 506 and server 502.

The network device routing tokens may include identification information corresponding to the network device 508 associated therewith (such as, for instance, an Internet Protocol (IP) address or other address uniquely associated with the network device 508). The network device routing tokens may include information corresponding to the adjacent network devices 508. Each of the network device routing tokens may be structured as a packet. Hence, a given packet of the connection information 604 may include a plurality of network device routing tokens for each of the network devices 508 located along the service connection. The network device routing tokens may be used by their respective network devices 508 for identifying a service connection, as described in greater detail below.

The controller 602 may be configured to communicate the connection information received from the service node 506 to the server 502 hosting the service 510. The controller 602 may be configured to communicate the connection information to the server 502 responsive to receiving the connection information (e.g., from the service node 506). The controller 602 may be configured to communicate the connection information to the server 502 via the network coupling the controller 602 and the server 502.

While described as the service node 506 communicating the connection information to the controller 602 and the controller 602 communicating the received connection information to the server 502, in some embodiments, the service node 506 may be configured to communicate the connection information (including the packet containing the network device routing tokens and service node routing token) directly to the server 502. For instance, the service node 506 may be communicably coupled to the server 502 via a network, and the service node 506 may be configured to communicate the connection information directly to the server 502 via the network.

Figure 7:
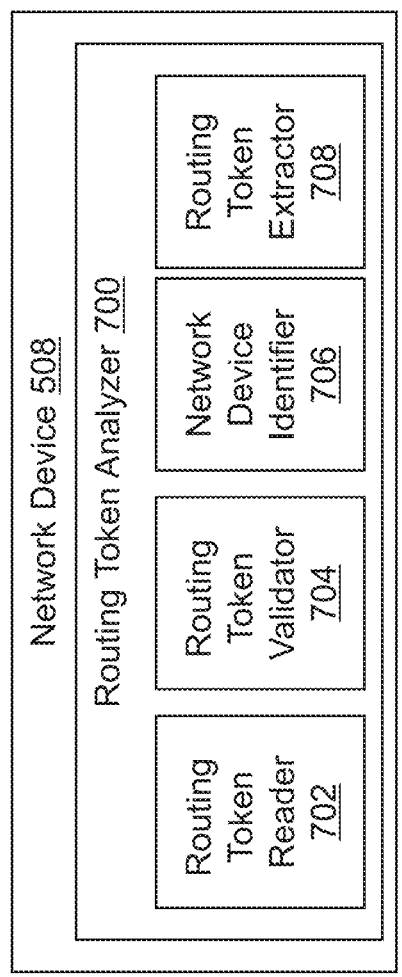
FIG. 7 is a block diagram of a network device, according to an example embodiment.

Referring now to FIG. 7, depicted is a block diagram of a network device 508, according to an illustrative embodiment. The network device 508 is shown to include a routing token analyzer 700. The routing token analyzer 700 may include a routing token reader 702, a routing token validator 704, a network device identifier 706, and/or a routing token extractor 708. In overview, the routing token analyzer 700 (e.g., via the routing token reader 702 or other component) may be configured to identify, receive, intercept, extract, and/or process a network device routing token within packets received from the server 502. The routing token reader 702 may be configured to determine, select, interpret, decipher, or otherwise read the routing token associated with the network device 508. The routing token validator 704 may be configured to validate the network device routing token read by the network device 508. The network device identifier 706 may be configured to identify the next node (e.g., the next network device 508) along the service connection. The routing token extractor 708 may be configured to extract the network device routing token corresponding to the network device 508 from the packet prior to delivering the packet to the next node.

In some embodiments or deployments, the network device 508 may communicate with or contact the controller 602, which may validate the routing token and identify the next node and provide the information to the network device 508. For instance, the routing token validator 704 and/or the network device identifier 706 may perform some of their operations or functionalities in communication with or via the controller 602, or the controller 602 may perform some of these operations or functionalities (instead of or on behalf of the routing token validator 704 and/or the network device identifier 706). For example, the controller 602 may maintain details of the routing token that is generated, for instance corresponding information such as the next node, internally or on a database (e.g., in a redistribution database). The routing token might include a valid key/ticket that can be used (e.g., by the routing token validator 704 and/or the network device identifier 706) to communicate with the controller 602 to fetch the data stored by the controller 602. In some embodiments, the key/ticket can be valid for only a one-time retrieval of the stored data. The network device 508 may thus contact, request or instruct the controller 602 to validate the routing token and identify the next node. In certain embodiments or implementations, there can be mixed deployments where some network devices 508 can communicate/interoperate with the controller 602 as described herein, and some network devices can process or validate routing tokens among themselves (e.g., without communicating/interoperating with the controller 602). In some embodiments, there can pre-exist a secure control channel between an intermediary node in a customer environment or cloud, and the controller 602, so that the initial connection establishment time is improved.

Referring now to FIG. 6 and FIG. 7 for instance, the server 502 may be configured to communicate the packet containing the network device routing tokens (e.g., received in the connection information 604 from the controller 602 and/or from the service node 506) to the first network device 508*a*. In some implementations, the server 502 may be configured to communicate the packet containing the network device routing tokens (e.g., with handshake data) during negotiation of a cryptographic context. In some implementations, the server 502 may be configured to communicate the packet containing the network device routing tokens prior to (and/or using separate packet(s) than that for) communicating handshake data and negotiation of the cryptographic context.

The first network device 508*a* may be configured to receive the packet containing the network device routing tokens. The routing token analyzer 700 may be configured to identify, select or determine the network device routing token associated with the first network device 508*a* within the packet containing each of the network device routing tokens. As described above, the network device routing tokens may include identification information corresponding to the sender, the destination, etc. (e.g., the first network device 508*a*). Such identification information may be contained in a header for the respective network device routing token, a payload, etc., or can be fetched or obtained from the controller 602 as described above in some embodiments. The routing token reader 702 of the routing token analyzer 700 may be configured to extract the identification information for each (or a subset) of the network device routing tokens contained in the packet received from the server 502. The routing token reader 702 may be configured to cross-reference the identification information in the network device routing tokens with self-identification information corresponding to the first network device 508a (for instance, stored on local memory of the first network device 508a). The routing token reader 702 may be configured to identify, select or determine the network device routing token associated with the first network device 508a (referred to hereinafter as "associated network device routing token") based on the cross-referencing of the identification information and self-identification information.

The routing token reader 702 may be designed or implemented to extract, identify, locate, decipher, parse out or otherwise read data or other information from the associated network device routing token. The routing token validator 704 may be configured to use the data read or fetched by the routing token reader 702 to validate (e.g., in communication or interoperation with the controller 602) the associated network device routing token. For instance, in some deployments, the network device can communicate with the controller for validation of the routing token, The routing token validator 704 (e.g., in communication/interoperation with the controller 602) may be designed or implemented to validate the associated network device routing token based on ownership of a public key. In some embodiments, the routing token validator 704 may distribute, disseminate, disburse, provide, generate or otherwise output public keys. The public keys may be disseminated widely. Hence, any entity, computing device, etc., which possesses the public key may encrypt a message or data using the public key. The service node 506 for the client 504 requesting access to the service 510 may receive the public key. The service node 506 may be configured to encrypt a message, data, or other information using the public key from the routing token validator 704. The service node 506 may generate the associated network device routing token and may embed the encrypted information into the associated network device routing token. In some embodiments, the controller 602 may generate the routing token (e.g., similar to the manner described above). The routing token validator 704 may maintain a private key which is used for decrypting information or data. When the associated network device routing token contains data which is encrypted, the routing token validator 704 may be configured to decrypt the data using the private key. The routing token validator 704 may be configured to validate the associated network device routing token based on the contents of the decrypted message (e.g., successful decryption using the private key corresponding to the public key), based on the associated network device routing token having data encrypted using the public key, etc.

The routing token validator 704 (e.g., in communication/interoperation with the controller 602) may be designed or implemented to validate the associated network device routing token using information about a pre-shared key (PSK). Prior to exchanging any packets between the service 510 and the service node 506, the routing token validator 704 may be configured to communicate a pre-shared key. The pre-shared key may include or correspond to a string of characters or dataset which may be used as a validation key. The service node 506 may be configured to generate and incorporate, embed, or otherwise include hash values in the associated network device routing token based on the pre-shared key(s). Following the network device receiving and identifying the hash values (e.g., within metadata accompanying the associated network device routing token, within the header of the associated network device routing token, etc.), the routing token validator 704 may validate the associated network device routing token using the hash value within the associated network device routing token. In some embodiments or cases, the service node routing token can be generated by the service node 506 and the routing tokens for intermediary devices can be generated by the controller 602. In some embodiments or cases, routing tokens can be generated by the controller 602 itself using the service node connection information received by the controller 602 from the service node 506 and/or the network device(s) 508. The connection information from the service node 506 to the controller 602 may include client details for generating the service node routing token on the controller 602. In some embodiments or cases, all the routing tokens can be generated by the service node 506 itself using information received through the client 504 and/or using information obtained from the controller 602 or network device(s) 508 or other means.

The routing token validator 704 may be designed or implemented to validate the associated network device routing token using information about a parameter uniquely associated with the first network device 508a. The routing token validator 704 may be configured to deliver, communicate, or otherwise provide the parameter (e.g., a unique identifier, a pin, a token, etc.) to the service node 506. The routing token validator 704 may provide the parameter to the service node 506 at enrollment (e.g., when the network device 508a is registered with the service node 506, for instance). The service node 506 may be configured to embed or otherwise incorporate the parameter into the associated network device routing token prior to transmitting the connection information to the controller 602 (or the server 502 directly). The routing token validator 704 may be configured to identify the parameter within the associated network device routing token. The routing token validator 704 may be configured to validate the associated network device routing token based on the associated network device routing token including the parameter uniquely associated with the first network device 508a. In some embodiments, one or more operations of the routing token validator 704 described herein can be performed by the controller 602, or in communication/interoperation with the controller 602. In certain embodiments, the network device(s) 508 may register to the controller 602 (e.g., to implement one or more of these operations).

In some embodiments, one or more network device(s) 508 may be configured to omit, skip or bypass validation of the associated network device routing token. Hence, in such network devices, the routing token validator 704 may be omitted from the routing token analyzer 700.

The network device identifier 706 (e.g., in communication/interoperation with the controller 602) may be configured to identify the next node along the service connection (e.g., adjacent to the first network device 508a along the service connection towards the service node 506). The network device identifier 706 may be configured to identify the next node based on data from the associated network device routing token. Such data may be incorporated in the payload for the associated network device routing token. As described above, the network device routing tokens may include data or information corresponding to the sending node (e.g., the preceding device or server), the destination node (e.g., the network device which received the packet containing the network device routing tokens), and the subsequent node (e.g., the next device which is to receive the packet containing the network device routing tokens from the destination node). The routing token reader 702 may be configured to extract the data or information pertaining to the subsequent node from the associated network device routing token. The network device identifier 706 may be configured to identify the subsequent node (e.g., the second network device 508b from FIG. 6) along the service connection based on the extracted data/information from the associated network device routing token.

The routing token extractor 708 may be designed or implemented to purge, delete, remove, obfuscate or otherwise extract the associated network device routing token from the packet containing the network device routing tokens. The routing token extractor 708 may be configured to extract the associated network device routing token prior to the network device 508 transmitting the packet containing the network device routing tokens to the subsequent node (continuing the previous example, the first network device 508a transmitting the packet to the second network device 508b). In some embodiments, the network device routing tokens may only be valid for one-time use (e.g., by each corresponding network device 508). The routing token is valid only once, such that if a packet with same routing tokens is sent from the server 502 to the network device 508a again, the network device 508a may drop the packet.

In some embodiments, the routing token extractor 708 may selectively extract or remove the associated network device routing token. The routing token extractor 708 on the last network device 508 that relies on or uses a particular network device routing token may remove the network device routing token from the packet prior to sending downstream along the network path towards the service node 506. For instance, where a network device routing token is associated with one or more network devices 508 along the network path, the network device routing token may include data corresponding to which network device(s) 508 the network device routing token is associated with. The data may include a list or identification of the network device(s) 508, an order of network devices 508, etc. The routing token extractor 708 may be configured to identify, based on such data, whether there are any subsequent network devices which are also associated with the network device routing token for the first network device 508a. The routing token extractor 708 may be configured to determine whether there are any subsequent network devices associated with the routing token based on, for instance, the location of the first network device 508a along the service connection. As one example, where the network device 508 is the first network device 508a in the service connection and the associated network device routing token includes data indicating that multiple network devices are associated with the associated network device routing token, the routing token extractor 708 may determine not to extract, remove or delete the associated network device routing token from the packet. Hence, the network device 508 may be configured to access the network device routing token in the packet for use and the network device routing token remains within the packet. The routing token extractor 708 may be configured to determine whether there are any subsequent network devices associated with the routing token based on the order of network devices associated with the routing token. As an example, the associated network device routing token for the second network device 508b may include data indicating that the associated network device routing token is associated with the first and second network device 508a, 508b, and the order in which the associated network device routing token will be used (e.g., first network device 508a followed by the second network device 508b). The routing token extractor 708 may be configured to identify the order of use of the associated network device routing token. The routing token extractor 708 may be configured to determine the location of the second network device 508b within the order. The routing token extractor 708 may be configured to determine, based on the order and the location of the second network device 508b within the order, that the second network device 508b is the last network device which is to use the associated network device routing token. The routing token extractor 708 for a given network device may be configured to extract the associated network device routing token from the packet following a determination that the network device is the last network device which will use the associated network device routing token. In some embodiments, the last network device 508 immediately adjacent to the service node 506 may be configured to extract all network device routing tokens.

In each of the above-mentioned embodiments, the routing token extractor 708 may generally be configured to extract associated network device routing tokens prior to any traffic packets being delivered to the service node 506. In some implementations, one or more packets (e.g., that are not traffic packets) may be delivered to the service node 506 with the network device routing tokens. In some embodiments, the service node 506 may not be designed or configured to process the routing tokens, may be configured to recognize that the routing tokens are associated with network devices and/or may disregard those routing tokens.

The network device 508 may be configured to pass, transmit, distribute, or otherwise direct the packet (e.g., containing each of the network device routing tokens except, in some embodiments, the network device routing token associated with the first network device 508a) to the subsequent node or device identified via the network device identifier 706 (e.g., sometimes in communication or interoperation with the controller 602). In some embodiments, the network device 508 may be configured to direct or process the packet via a network using, for instance, a local cryptographic context (e.g., between each adjacent/immediate pair of nodes or network devices 508 in the network path of the service connection). For instance, two immediate nodes along the service connection may be communicably coupled to one another and configured to pass data amongst one another. The two immediate nodes may negotiate a local cryptographic context. Negotiation of the local cryptographic context may be similar in at least some aspects to negotiation of the cryptographic context between the server 502 and service node 506, as described in greater detail below. In this regard, two immediate nodes may share a local cryptographic context while the server and service node 506 may share another cryptographic context.

The second network device 508b may be configured to identify and read its associated network device routing token via the routing token reader 702, validate its associated network device routing token via the routing token validator 704 (and/or the controller 602), identify the next node, the third network device 508c, via the network device identifier 706 (and/or the controller 602), extract its associated network device routing token via the routing token extractor 708, and direct the packet containing the remaining network device routing tokens to the next node (via a network shared between the second network device 508b and next node). Such steps may be repeated until the last node (e.g., adjacent to the service node 506) receives their associated network device routing token. Such embodiments may define the service connection between the service node 506 and server 502 by providing each of the network devices 508 situated or located along the service connection their corresponding routing tokens.

The server 502 and service node 506 may be configured to negotiate an end-to-end cryptographic context between the server 502 and service node 506. In some embodiments, negotiation of the end-to-end cryptographic context may begin between the server 502 and service node 506 following establishment of the network path according to the network device routing tokens. For example, each of the nodes (e.g., network devices 508) along the network path can capture, record, store and/or maintain the information obtained from their corresponding routing tokens (e.g., information identifying the next node in the network path). Such information can be stored with a corresponding identifier (e.g., an identifier of the service connection, obtained from or based on the connection information for instance), so that the same information can be applied to the same service connection for instance. Hence, the handshake data for negotiating the cryptographic context may be sent across the network path of the service connection established, identified, or otherwise determined via the routing tokens. As such, the network path and/or service connection between the service node 506 and server 502 may be established using the network device routing tokens and, following establishment of the network path and service connection, the negotiation of the cryptographic context between the service node 506 and server 502 may occur by routing or directing the handshake data along the network path across the service connection.

In some embodiments, the service connection may not have any intermediary cryptographic contexts along the service path, or may have intermediary cryptographic contexts between some selective nodes within the service path, or may have intermediary crypto contexts between all the nodes with in the service path, depending on the deployment. In some embodiments, creation of intermediary cryptographic contexts along the service path is avoided completely, hence providing improved initial connection establishment time. For example, the creation of intermediary cryptographic contexts can be avoided by using the one-time valid routing tokens, hence providing improved initial connection establishment time, and avoiding increased consumption of computing resources (e.g., transmission bandwidth and/or computing/processing resources).

In some embodiments, the server 502 may be configured to communicate handshake data for negotiating the cryptographic context to the service node 506 (e.g., through the network devices 508 along the service connection) with the packet containing the network device routing tokens. The server 502 may be configured to communicate the handshake data using a similar or the same mechanism as routing tokens, to direct the handshake data along the network path. The handshake data may be incorporated into, packaged with, or otherwise transmitted in conjunction with the packet containing the network device routing tokens. In some embodiments, when the handshake data is received by the service node 506, the network device routing tokens may have been extracted from the packet by the routing token extractor(s) 708 of the network device(s) 508. Hence, in such embodiments, the service node 506 may be configured to receive the handshake data from the server 502 without any of the network device routing tokens. In some embodiments where the packet containing the network device routing tokens and handshake data are transmitted by the server 502 to the service node 506 via the network devices 508, the network device routing tokens may not be extracted/removed from the packet. Hence, the service node 506 may receive each of the network device routing tokens with the handshake data. In some embodiments, the service node 506 may be configured to, or in a condition to disregard, ignore, or otherwise not use the network device routing tokens.

Figure 8:
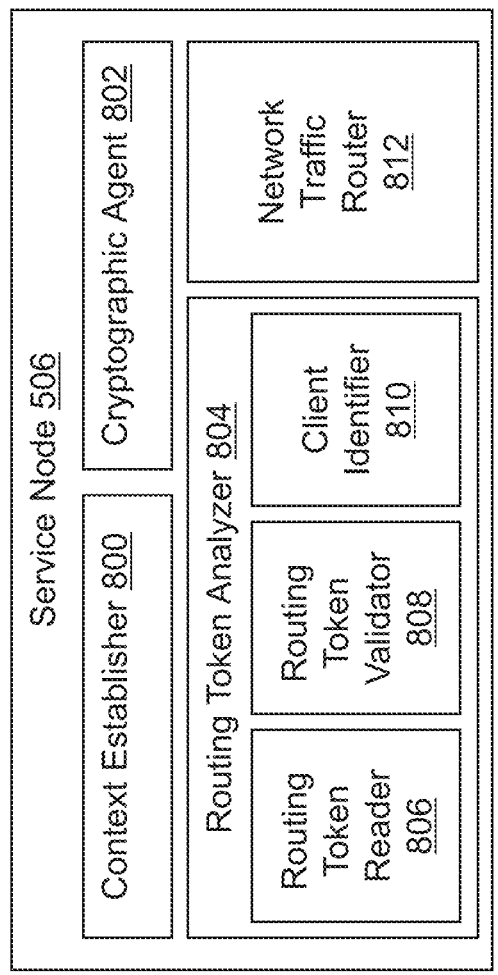
FIG. 8 is a block diagram of a service node, according to an example embodiment.

Referring now to FIG. 8, depicted is a block diagram of a service node 506, according to an example embodiment. The service node 506 is shown to include a context establisher 800, a cryptographic agent 802, a routing token analyzer 804, and a network traffic router 812. In overview, the context establisher 800 may be configured to negotiate and establish the cryptographic context between the service node 506 and the server 502. The cryptographic agent 802 may be configured to encrypt and/or decrypt traffic according to one or more cryptographic contexts. The routing token analyzer 804 is shown to include a routing token reader 806, a routing token validator 808, and/or a client identifier 810. The routing token reader 806 and routing token validator 808 may be similar in at least some aspects to the routing token reader 702 and/or routing token validator 704 of the network device 508. For instance, the routing token reader 806 may be configured to identify, select or determine information or data contained in the service node routing token. The routing token validator 808 may be configured to validate the service node routing token and/or the server 502 based on the identifier information or data in the service node routing token. In certain embodiments, the routing token validator 808 may communicate and/or interoperate with the controller 602 to validate the service node routing token (e.g., similar to the routing token validator 704 of the network device 508). In some deployments or embodiments, there can pre-exist a secure control channel between the service node 506 and the controller 602, so that the initial connection establishment time can be improved. The client identifier 810 may be configured to identify or determine the client 504 which requested access to the service 510 executing on the server 502. The network traffic router 812 may be configured to route network traffic between the client 504 and server 502.

The service node 506 may be configured to use the handshake data for negotiating the end-to-end cryptographic context. The end-to-end cryptographic context may be used for establishing a secure channel between the service node 506 and the server 502. Negotiation of the end-to-end cryptographic context can involve communication between any two or more of the following nodes: server 502, network devices 508, service node 506 and/or client 504, and in one or both directions along the network path. The service node 506 may include a context establisher 800 and a cryptographic agent 802. The context establisher 800 may generally be configured to establish/negotiate/create/form a cryptographic context between the server 502 and service node 506. The cryptographic agent 802 may generally be configured to encrypt and/or decrypt network traffic in accordance with the cryptographic context. While shown as embodied on the service node 506, the server 502 may similarly include a context establisher 800 and/or cryptographic agent 802. The context establisher 800 for the server 502 and service node 506 may together negotiate the cryptographic context.

Negotiation of the cryptographic context can include handshaking communications in one or both directions of the network path, passing of information (e.g., including instructions) between or across the nodes, adjustment/acknowledgement/acceptance/counterproposal on the information at certain node(s), and/or establishment of the cryptographic context. In some embodiments, the cryptographic context may be or include an end-to-end cryptographic context. In such embodiments, the end-to-end cryptographic context may be established between the service node 506 and server 502. In such embodiments, negotiation of the cryptographic context may occur directly between the service node 506 and the server 502 (e.g., using the handshake data). Hence, the network devices 508 that are intermediary between the server 502 and the service node 506, along the network path already established between server 502 and service node 506 through routing tokens arranged along the service connection, may pass the handshake data without processing or with minimal processing of the handshake data, thus permitting direct negotiation of the cryptographic context between the server 502 and service node 506. For instance, each of the intermediary nodes can direct the handshake data to the next intermediary node previously indicated by the routing token(s), and can do this responsive to detecting or identifying an identifier (e.g., of the service connection) communicated with or shared by the routing tokens and the handshake data. If the identifier is communicated or provided with the handshake data to a particular network node 508, the network node 508 can recognize or determine that it is to send the handshake data to a next network node 508 consistent with the network path established by the routing tokens (associated with the identifier). In some embodiments, the handshake data may be routed along the network path according to a mechanism similar to or the same as routing tokens. The network devices 508 arranged along the service connection between the service node 506 and server 502 may exchange network traffic between the service node 506 and server 502 without decrypting or re-encrypting the network traffic (using local cryptographic contexts). Hence, the network traffic may be encrypted by the source (e.g., the server 502 or the service node 506) according to the end-to-end cryptographic context, passed by each of the network devices 508 (e.g., without processing) along the service connection to the next network device without decrypting or re-encrypting the network traffic, and decrypted at the destination or the other end (e.g., the other one of the server 502 or service node 506). As such, the network devices 508 may act or operate in a "bit-pump" mode, where the network devices 508 pass data to the next node along the service connection without any decrypting and deciphering (e.g., without processing the payload) of the network traffic.

An end-to-end cryptographic context can refer to a cryptographic context that extends (e.g., is shared) between a sender (or source) and recipient (or destination) of traffic, and also extends over (e.g., is shared with) network node(s) intermediary between the sender and the recipient. An end-to-end cryptographic context can be configured such that the traffic is not decrypted by any of the intermediary nodes. Accordingly, in-flight and stored data remains encrypted and is not decrypted by intermediary network nodes other than nodes corresponding to the source or final destination. More generally, a cryptographic context can include or correspond to an encryption or decryption configuration, standard and/or protocol shared between two or more nodes that are in communication with each other. The end-to-end cryptographic context, however, may refer or pertain to encryption of packets throughout the time between encryption by the sender (e.g., source of the packets) and decryption by the recipient (e.g., ultimate destination). In this regard, intermediaries (e.g., network devices 508, intermediary devices, etc.) may not decrypt the packet in an end-to-end cryptographic context. Rather, in an end-to-end cryptographic context, the packet remains encrypted up to and until the packet reaches the intended recipient. Hence, a cryptographic agent 802 of the service node 506 may encrypt content to be delivered to the server 502. If the context establisher 800 does not establish an end-to-end cryptographic context (e.g., the cryptographic context is shared between adjacent nodes from the service node 506 to the server 502), the content or traffic encrypted by the cryptographic agent 802 may be delivered from the service node 506 to the network device 508, decrypted, and analyzed by each of the nodes between the service node 506 and server 502. In deployments or embodiments where the service path does not have any intermediary cryptographic contexts established, and/or does not have the end-to-end cryptographic context created, the traffic between the service node and the server can be unprotected.

The context establisher 800 may be configured to form, create, generate, or otherwise establish a cryptographic context between the server 502 and the service node 506. The cryptographic context may be or include any information regarding a cryptographic arrangement, configuration and/or algorithm (e.g., cryptographic protocol, procedure, process, construct, formulation, key(s), credentials and/or secret(s)) which is/are to be used for encrypting and decrypting network traffic. The cryptographic context can incorporate or include: one or more symmetric-key algorithms, such as block ciphers (e.g., Advance Encryption Standard (AES) of 128 bits or 256 bits, Rivest Cipher-5 (RC5) of 64 bits or 128 bits, or Blowfish cipher), stream ciphers (e.g., A5/1, A5/2, HC-256, or Rivest Cipher-4 (RC4) or 1684 or 2064 bits), or others (e.g., Kerberos protocol); asymmetric-key algorithms (e.g., Digital Signature Algorithm, Elliptic Curve algorithm, Rivest-Shamir-Adleman (RSA), and Diffie-Hellman key exchange protocol); and cryptographic hash functions (e.g., hash-based message authentication code (HMAC), message-digest algorithm (MD5), and Secure Hash Algorithm (SHA-1, SHA-2, and SHA-3)). The cryptographic context can incorporate, specify or include key-related information, such as a set of non-secret key-value pairs. The cryptographic context can provide an indication (e.g., an identifier, handle, name and/or type) of a cryptographic service provider (CSP), and can include the specification of a particular key container (e.g., within the CSP). The cryptographic context can incorporate, specify or include information (e.g., parameters) for creating, establishing, identifying, accessing and/or using a key container and/or keys (e.g., a session key). In some embodiments, each of the network devices 508 may share a cryptographic context with a directly adjacent network device 508 (or server 502) in the network path between the server 502 and service node 506. For instance, the n-th network device 508 nearest to the server 502 may share a cryptographic context with the server 502. Such cryptographic contexts may each be the same or may be different from one or more of the other cryptographic contexts. In some embodiments, the service connection may not have any intermediary cryptographic contexts along the service path, or may have intermediary cryptographic contexts between some selective nodes within the service path, or may have intermediary crypto contexts between all the nodes with in the service path, depending on the deployment. In some embodiments, creation of intermediary cryptographic contexts along the service path is avoided completely, hence providing improved initial connection establishment time. For example, the creation of intermediary cryptographic contexts can be avoided by using the one-time valid routing tokens, hence providing improved initial connection establishment time, and avoiding increased consumption of computing resources (e.g., transmission bandwidth and/or computing/processing resources).

The context establisher 800 may be configured to form, create, generate, or otherwise establish the end-to-end cryptographic context between the service node 506 and the server 502 through the network devices 508. The context establisher 800 may be configured to establish the end-to-end cryptographic context following (or before, or in parallel with, or independent of) transmission or passing of the packet containing the network device routing tokens. The context establisher 800 may be configured to establish the end-to-end cryptographic context for forming a secure channel by which the traffic is exchanged between the server 502 and the service node 506. The context establisher 800 may be configured to establish the end-to-end cryptographic context by communicating messages between the server 502, the service node 506, and/or other nodes. For instance, the service node 506 may be configured to communicate a message or request to the server 502 requesting the end-to-end cryptographic context. In some instances, the server 502 may be configured to communicate a message or request to the service node 506 to generate the end-to-end cryptographic context. The service node 506 and server 502 may be configured to perform, for instance, a handshake process to authenticate each other and, following such authentication, the service node 506 may establish the end-to-end cryptographic context.

As a part of or during negotiation of the cryptographic context, and in some embodiments, the server 502 may be configured to validate the service node 506, or the service node 506 may be configured to validate the server 502, or both of the preceding can occur. The server 502 may be configured to validate the service connection by authenticating the service node 506 (and vice versa). The server 502 may validate the service connection via having the service node authenticating to the server 502. In some embodiments, the service node 506 and/or server 502 may authenticate one another for the purpose of validating one another. The server 502 may validate and/or authenticate the service node 506 to confirm that the packet is delivered by the proper entity (e.g., the service node 506 in fact, instead of an entity that may be trying to pass off as the service node 506). The server 502 may validate and/or authenticate the service node 506 using, for instance, the handshake data communicated between the server 502 and service node 506 which may include a security token, a PIN, ID, tag, credentials, or other unique identifier, certificate, etc. In some embodiments, the server 502 may be configured to authenticate the service node 506 using one or more of the methods of validating described above. In some embodiments, the server 502 may be configured to both authenticate the service node 506 and validate the service node 506 (e.g., via means other than authentication). The server 502 may validate the service node 506 using one technique, and the server 502 may authenticate the service node 506 using another technique.

In some embodiments, validation of the server 502 and/or service node 506 may be foregone or omitted (e.g., does not occur). Such instances or cases may depend on the network arrangements or policies, whether the server 502/service node 506 have recently been validated or authenticated, etc.

Following establishment of the secure channel using the end-to-end cryptographic context, the server 502 may be configured to transmit a service node routing token to the service node 506. The server 502 may be configured to transmit the service node routing token via the secure channel. In some embodiments, the service node routing token is transmitted by the server 502 to the service node 506 across the secure channel and independent of the packet containing the network device routing tokens. Hence, the server 502 may be configured to encrypt the service node routing token according to the end-to-end cryptographic context. The service node routing token may thus be securely transmitted to the service node 506 and, therefore, protected from malicious or inadvertent receipt by other entities. The server 502 may be configured to transmit the service node routing token to the service node 506 via the secure channel (e.g., through the network devices). Each of the network devices 508 may be configured to pass through the service node routing token without decrypting and re-encrypting the service node routing token. Such embodiments can protect and maintain the integrity of the service node routing token, facilitate communication of the service node routing token from the server 502 efficiently to the service node 506, and/or can avoid or reduce unnecessarily processing of the service node routing token at each of the network device 508.

The service node 506 may be configured to receive the service node routing token. The service node routing token may be similar in some aspects to the network device routing token. For instance, the service node routing token may include identification information corresponding to the sender (e.g., the server 502) and/or the recipient (e.g., the service node 506). Such identification information may be contained in a header for the service routing token, in a payload, etc. The routing token reader 806 may be configured to extract the identification information for the service node routing token from the server 502. The routing token reader 806 may be designed or implemented to extract, identify, locate, decipher, or otherwise read data or other information from the service node routing token. The routing token validator 808 may be configured to use the data read by the routing token reader 806 to validate the service node routing token.

The routing token validator 808 may be configured to validate the server 502 (e.g., in communication/interoperation with the controller 602). In some embodiments, the routing token validator 808 is configured to validate the server 502 based on information contained in the service node routing token. In some embodiments, the routing token validator 808 may validate the server 502, and the server 502 may validate the service node 506. The routing token validator 808 may be configured to validate the server 502 in a manner similar to the validation described above with respect to the routing token validator 704. For instance, the service node 506 be configured to validate the server 502 based on a public/private key, pre-shared key, a unique identifier, etc. The service node routing token may include data which is encoded using the private key, pre-shared key, includes the unique identifier, etc. The routing token validator 808 may be configured to validate the server 502 based on such data. In certain embodiments, one or more operations of the routing token validator 808 (e.g., similar to the routing token validator 704 of the network device 508) described herein can be performed by the controller 602, or in communication/interoperation with the controller 602. In certain embodiments, there can pre-exist a secure control channel between the service node 506 and the controller 602, so that the initial connection establishment time can be improved. While described as validating the server 502 based on data in the service node routing token, it is noted that the service node 506 may similarly validate the server 502 such as during negotiation of the end-to-end cryptographic context, using data contained in the handshake data. Hence, the present disclosure is not limited to a particular point in which the service node 506 validates the server 502. In some embodiments, validation may be omitted. However, having various validations between the server 502 and the service node 506 can ensure that if any of the above validation is missed, the service connection shall still be validated by other means, e.g., by the service node 506 through the service node routing token, and/or by the server 502 via the service node 506 authenticating to the server 502. In addition, early validation may permit early detection or identification of an invalid service connection between the server 502 and service node 506, so that other actions may be performed to address the situation.

The server 502 may be configured to authenticate service node 506 based on data received from the client 504 (e.g., within the request, for instance). The data may include, for instance, a Secure Ticket Authority (STA) ticket from the client 504. The STA ticket may include data for identification of authentication information from an STA server. The STA server may correspond to or include a server which stores authentication information corresponding to various devices, such as the server 502 and/or service 510. The service node 506 may (e.g., use the STA ticket to) fetch data from the STA server and authenticate to the server 502 and/or service 510. The service node 506 may authenticate to the server 502 and/or service 510 using, for instance, a security token, a personal identification number (PIN), identifier (ID), tag, credentials, or other unique identifier, etc., which may be related to the service connection, and received from the client 504 and compared to information or data of the server 502 (e.g., during the negotiation of the cryptographic context). In some embodiments, the server 502 may authenticate the service node 506, using data directly received in one or more packets from the client 504.

Referring again to FIG. 8 for instance, the client identifier 810 may be configured to identify the client 504 which requested access to the service 510. The service node routing token may include or incorporate identification information (e.g., obtained from or based on the connection information 604 from the controller 602 for instance) corresponding to the client 504 which requested access to the service 510. For instance, the service node routing token may include an IP address or other unique identifier associated with the client 504. The client identifier 810 may include or maintain a list of clients 504 for which the service node 506 regulates or routes network traffic. The client identifier 810 may be configured to cross-reference the identifier associated with the client 504 in the service node routing token with the list of clients. The client identifier 810 may be configured to identify the client 504 which requested access to the service 510 based on such cross-referencing. In some embodiments, the client identifier 810 may identify or select one of at least one connection between client(s) 504 and the service node 506, to link with the service connection, using the identifier associated with the client 504, an identifier of the service connection and/or other information derived from the connection information 604.

The service node 506 may thus act as a rendezvous point for the server 502 and client 504. As discussed above, the client 504 provides the request to access the service 510 executing on the server 502. The server 502 then establishes the service connection along the network path via the routing tokens. Hence, the overall connection between the server 502 and client 504 is established from the server 502 and the client 504 inward (e.g., toward the service node 506). In some cloud deployments for example, to keep security in view, no connection should come inward from cloud to server in a customer environment (e.g., be initiated from the service node 506 in the cloud towards the server 502 in the customer environment). Hence, embodiments of the present solution can provide or initiate a rendezvous connection from the server 502 to the service node 506. For example, a customer (e.g., via server 502) may have registered to the controller 602 in the cloud and there might already exists a control channel between customer environment and controller 602. Hence the controller 602 can push or deliver the routing tokens to the customer environment through the existing control channel, which the server 502 in the customer environment can use to initiate a rendezvous connection towards the service node 506. The network traffic router 812 may be configured to route network traffic between the client 504 and the server 502. Following establishment of the secure channel between the server 502 and service node 506 (e.g., after all routing tokens have been received by their corresponding nodes and, optionally, validated to create a service path over which an end-to-end cryptographic context can be created to form a secure channel) and identification of the client 504 with which to connect (e.g., which requested access to the service 510), network traffic may be exchanged between the server 502 and client 504. In some embodiments, the client 504 and service node 506 may share a local cryptographic context (which may be separate from the end-to-end cryptographic context). In such embodiments, the service node 506 may be configured to decrypt incoming network traffic (e.g., via the cryptographic agent 802) prior to transmission of the network traffic to its destination. For instance, incoming network traffic from the client 504 may be encrypted by the client 504 according to the local cryptographic context. The service node 506 may be configured to decrypt the incoming network traffic from the client according to the local cryptographic context, and encrypt the decrypted network traffic according to the end-to-end cryptographic context. The network traffic router 812 may be configured to transmit the encrypted network traffic (e.g., encrypted according to the end-to-end cryptographic context) to the server 502 via the secure channel. Similarly, incoming network traffic from the server 502 may be encrypted by the server according to the end-to-end cryptographic context. The service node 506 may be configured to decrypt the incoming network traffic from the server 502 according to the end-to-end cryptographic context, and encrypt the decrypted network traffic according to the local cryptographic context. The network traffic router 812 may be configured to transmit the encrypted network traffic (e.g., encrypted according to the local cryptographic context) to the client 504.

Figure 9:
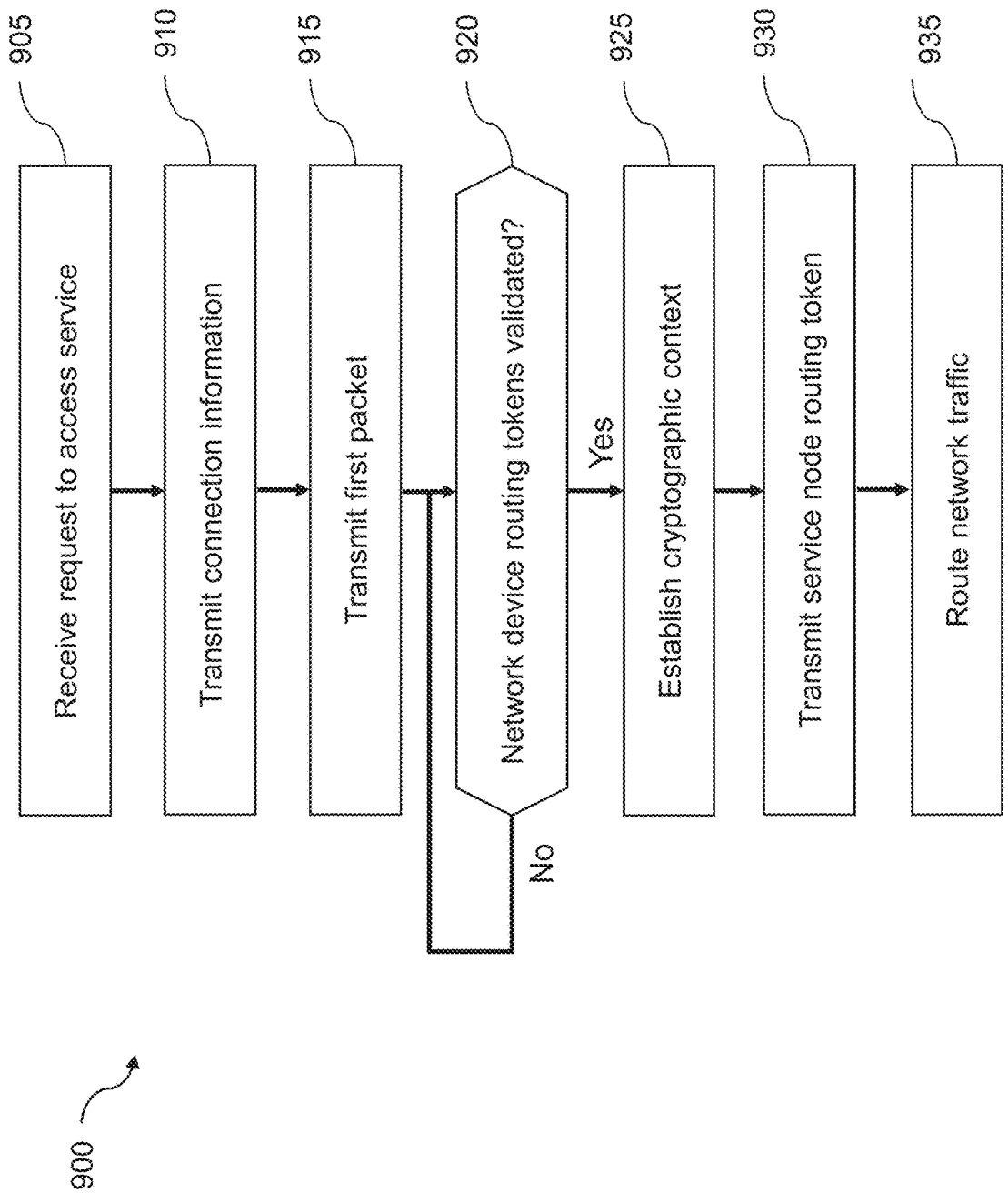
FIG. 9 is a flow diagram of an embodiment of a method of establishing a secure connection, according to an illustrative embodiment.

Referring now to FIG. 9, depicted is a flow diagram for a method 900 for establishing a secure connection using routing tokens, according to one illustrative embodiment. The functionalities of method 900 may be implemented using, or performed by, the components described in FIGS. 1-8, such as the service node 506, the server 502, the client 504, and/or the network device(s) 508. In brief overview, a service node receives a request to access a service (905). The service node transmits connection information (910). The server transmits a first packet (915). The server determines whether the network device routing tokens are validated (920). Where the network device routing tokens are not validated, the server waits until the network device routing tokens are validated. Following validation, the server and service node establish a cryptographic context (925). The server transmits a service node routing token (930). The service node routes network traffic (935).

At operation (905), and in some embodiments, the service node receives a request to access a service. The service node may receive the request from a client. The service may be hosted or otherwise executing on a server. The service node may be arranged intermediary between the server and client. A plurality of network devices may be arranged intermediary between the service node and server. The service node may receive the request responsive to for instance a user selecting at the client an icon corresponding to the service, providing a URL, selecting a link, etc., corresponding to the service, or otherwise requesting access to the service. The client may communicate the request to the service node via a client connection between the service node and client. In some embodiments, the client connection may be secured. The client connection may be a secure connection such that the request (and other data exchanged between the service node and client) are encrypted. The data may be encrypted via a local cryptographic context shared between the service node and client. The service node and client may negotiate and/or establish the local cryptographic context when the client and/or the service node are activated, registered or otherwise incorporated into the computing environment, or during initiation of a service request from the client 504 towards the service node 506. The service node and the client may negotiate the local cryptographic context in a manner similar to negotiation of a cryptographic context discussed in greater detail with reference to operation (925).

The request may include various information corresponding to the requested service. For instance, the request may include information corresponding to the server on which the service is hosted. The request may include identification information corresponding to the client. The request may include authentication information corresponding to the server and/or service. The authentication information may include, for instance, an STA ticket corresponding to the server. Such information may be used by the service node for authenticating the server, as discussed in greater detail below with reference to operation (925).

At operation (910), and in some embodiments, the service node transmits connection information. The connection information may be compiled, built, assembled, etc. by the service node based on the request from the client to access the service executing on the server. The service node may generate or otherwise use a plurality of routing tokens for establishing a service connection between the service node and the server. As discussed herein, the routing tokens can in some embodiments be generated by the controller, where the connection information 604 is provided to the controller and the controller can generate the routing tokens. In some embodiments or deployments, the service node can generate the service node routing token, and may also provide the connection information 604 to the controller, such that the controller may generate the remaining routing tokens for network devices.

The service connection may extend along a network path between a plurality of the network devices intermediary between the server and service nodes. Each of the routing tokens may be validated by a corresponding network device of the plurality of network devices. The routing tokens may be uniquely associated with a particular network device. The routing tokens may be valid for one-time use by the particular network device, and can avoid replay attack(s) on the service node for instance, when the connection from the server can reach the service node only through the intermediary network devices along the service path. As such, the routing tokens may have a one-to-one relationship, where one routing token is valid on one particular network device.

In some embodiments, some routing tokens may be associated with a subset of the network devices (e.g., more than one network device). Hence, in either embodiment, each network device may have a dedicated or specific routing token. At least one of the routing tokens may be uniquely associated with the service node. Thus, the connection information may include, at least, routing tokens associated with network devices (referred to herein as "network device routing tokens") and a routing token associated with the service node (referred to herein as "service node routing token").

The routing tokens may be or include data intended for the node (network device) to which it corresponds. For instance, the routing tokens may be included and transmitted in a packet. The packet may include various data which is used by the respective node for identifying the sending node, the destination node (the node to which the respective routing token corresponds), and/or the subsequent node, etc. Each node may receive their respective routing token in a packet containing, in most instances, a plurality of routing tokens. The node may validate its routing token, identify the next node according to information of the routing token, and pass the packet containing the routing tokens to the next node, as discussed in greater detail below.

The controller may communicate or deliver connection information (e.g., including the routing tokens) to the server. In some embodiments, the service node may communicate the connection information (e.g., including the routing tokens, or information to be used for forming the routing tokens) to the server hosting or otherwise executing the service requested by the client. For instance, the service node may communicate the connection information directly to the server. In some embodiments, the service node may communicate the connection information to a controller. The controller may then route, distribute, pass, or otherwise communicate the connection information from the service node to the server. In some embodiments, the service node may generate routing tokens, which are incorporated into the connection information by the service node. In some embodiments, the controller may generate routing tokens intended for the network devices (e.g., using the connection information received from the service node), and the service node may generate certain routing tokens, such as the service node routing token. In certain embodiments, the controller may modify the connection information to include the generated routing tokens and send the modified connection information to the server, the controller may send the generated routing tokens separate from (but at substantially the same time as) the connection information, etc. In each of these embodiments, the server may receive the connection information, either directly or indirectly, from the controller or the service node.

In some cloud deployments, to keep security in view, no connection should come inward from cloud to the server in a customer environment (e.g., be initiated from the service node in the cloud towards the server in the customer environment). Hence, embodiments of the present solution can provide or initiate a rendezvous connection from the server to the service node. For example, a customer (e.g., via server) may have registered to the controller in the cloud and there might already exists a control channel between customer environment and controller. Hence the controller can push or deliver the routing tokens to the customer environment through the existing control channel, which the server in the customer environment can use to initiate a rendezvous connection towards the service node.

In some embodiments, there can exists a control connection between the service node and the server through which the routing tokens can be delivered to the server. The server can use the routing tokens for establishing/securing a separate rendezvous connection for data traffic between the server and the service node.

In some embodiments, each of the routing tokens may be valid for a predetermined duration of time. For instance, each routing token may be valid for the time (or an expected time window) it takes for each node to receive their respective routing token and validate their respective routing token. In some implementations, the routing tokens may each have a different predetermined duration of time in which they are valid. For instance, nodes which receive their respective routing token earlier may have a shorter predetermined duration time whereas nodes which receive their respective routing token later may have a longer predetermined duration of time in which the routing tokens are valid. Such implementations may compensate for delays and/or latencies in delivery (and, correspondingly, receipt) of the routing tokens to some nodes.

At operation (915), and in some embodiments, the server transmits a packet. In some embodiments, the server transmits the packet towards the service node. The packet may include the plurality of network device routing tokens. The server may transmit the packet to a first network device of the plurality of network devices. The first network device may be immediately adjacent to the server along the network path between the server and service node. The server may cause the first network device to validate a first routing token of the plurality of routing tokens, direct the packet along the network path to a second network device, and so forth, according to the first routing token. Hence, the first network device may receive the packet, validate the first routing token, and direct the packet to a second network device according to the first routing token.

The first network device may be configured to receive the packet containing the network device routing tokens. The first network device may include a routing token analyzer which identifies the network device routing token associated with the first network device (e.g., referred to above as the first routing token) within the packet containing each of the network device routing tokens. As described above, the network device routing tokens may include identification information corresponding to the sender, the destination, etc. Such identification information may be contained or included in a header for the respective network device routing token, in a payload, etc. The routing token analyzer may extract the identification information for each (or a subset) of the network device routing tokens contained in the packet received from the server. The routing token analyzer may reference, match or relate the identification information in the network device routing tokens with self-identification information corresponding to the first network device. The routing token analyzer may identify the network device routing token associated with the first network device (referred to hereinafter as "the first routing token") based on the referencing of the identification information and self-identification information.

In some embodiments or deployments, the network device may communicate with or contact the controller, which may validate the routing token and identify the next node and provide the information to the network device. For instance, a routing token validator and/or a network device identifier of the routing token analyzer may perform some of their operations or functionalities in communication with or via the controller, or the controller may perform some of these operations or functionalities (instead of or on behalf of the routing token validator and/or the network device identifier). For example, the controller may maintain details of the routing token that is generated, for instance corresponding information such as the next node, internally or on a database (e.g., in a redistribution database). The routing token might include a valid key/ticket that can be used (e.g., by the routing token validator and/or the network device identifier) to communicate with the controller to fetch the data stored by the controller. In some embodiments, the key/ticket can be valid for only a one-time retrieval of the stored data. The network device may thus contact, request or instruct the controller to validate the routing token and identify the next node. In certain embodiments or implementations, there can be mixed deployments where some network devices can communicate/interoperate with the controller as described herein, and some network devices can process or validate routing tokens among themselves (e.g., without communicating/interoperating with the controller). In some embodiments, there can pre-exist a secure control channel between an intermediary node in a customer environment or cloud, and the controller, so that the initial connection establishment time is improved.

The routing token analyzer may extract, identify, locate, decipher, or otherwise read data or other information from the first routing token. The routing token analyzer may be configured to use the data extracted from the first routing token to validate the first routing token (e.g., by communicating/interoperating with the controller). The routing token analyzer may validate the first routing token based on ownership of a public key. In some embodiments, the routing token analyzer may distribute, disseminate, disburse, provide, generate or otherwise output public keys. The public keys may be disseminated widely. Hence, any entity, computing device, etc., which possesses the public key may encrypt a message or data using the public key. The service node for the client requesting access to the service may receive the public key. The service node may encrypt a message, data, or other information using the public key from the routing token analyzer. The service node may embed the encrypted information into the first routing token. The routing token analyzer may maintain a private key which is used by the routing token analyzer for decrypting information or data. When the first routing token contains data which is encrypted using the public key, the routing token analyzer may decrypt the data using the private key. The routing token analyzer may validate the first routing token based on the contents of the decrypted message (e.g., successful decryption using the private key corresponding to the public key), based on the first routing token having data encrypted using the public key, etc.

The routing token analyzer (e.g., in communication or interoperation with the controller) may validate the first routing token using information about a pre-shared key (PSK). Prior to exchanging any packets between the server/service and the service node, the routing token analyzer may communicate a pre-shared key (for instance, at enrollment or incorporation into the computing environment). The pre-shared key may include or correspond to a string of characters or dataset which may be used as a validation key. The service node may generate and incorporate, embed, or otherwise include hash values in the first routing token based on the pre-shared key(s). Following the first network device receiving and identifying the hash values (e.g., within metadata accompanying the first routing token, within the header of the first routing token, etc.), the routing token analyzer may validate the first routing token using the hash value within the first routing token.

The routing token analyzer (e.g., in communication/interoperation with the controller) may be designed or implemented to validate the first routing token using information about a parameter uniquely associated with the first network device which is incorporated into the first routing token. The routing token analyzer may be configured to deliver, communicate, or otherwise provide the parameter (e.g., a unique identifier, a pin, a token, etc.) to the service node. The routing token analyzer may provide the parameter to the service node at enrollment (e.g., when the network device is registered with the service node, for instance). The service node may be configured to embed or otherwise incorporate the parameter into the associated network device routing token prior to transmitting the connection information to the controller (or the server directly). In some embodiments, the routing token analyzer may be configured to deliver, communicate, or otherwise provide the parameter (e.g., a unique identifier, a pin, a token, etc.) to the controller. The routing token analyzer may provide the parameter to the controller at enrollment (e.g., when the network device is registered with the controller, for instance). The controller may be configured to embed or otherwise incorporate the parameter into the associated network device routing token prior to transmitting the connection information to the server. The routing token analyzer may identify the parameter within the first routing token. The routing token analyzer may validate the associated first routing token based on the first routing token including the parameter uniquely associated with the first network device.

In some embodiments, the packet conveying the routing token(s) can only be sent once. Some network device(s) can omit, skip or bypass validation of a routing token if such network device(s) are configured/instructed to do so. Also, in some deployments or embodiments, the network device might be back-to-back or directly connected or coupled with the next/previous network device in which case the network device can omit the validation.

Following receipt of the first routing token and, in some implementations, validation of the first routing token, the routing token analyzer may identify the next node along the network path between the server and service node. The routing token analyzer may identify the next node based on information contained or otherwise incorporated into the first routing token (e.g., the identification information corresponding to the subsequent node). The first network device may direct the packet containing the routing tokens to the next node (e.g., a second network device). The second network device may receive the packet containing the routing tokens, identify (and, optionally, validate) its respective routing token, identify the next node, and direct the packet containing the routing tokens to the next node. Such receiving/identifying/validating/identifying/directing may be sequentially performed by each node (e.g., in communication and/or interoperation with the controller) along the network path between the server and service node for establishing the service connection between the server and service node.

In some embodiments, the first network device may extract (e.g., remove or delete) the first routing token from the packet. The first network device may extract the first routing token following identification of the next node. In some embodiments, the first network device may selectively extract the first routing token. The first network device may extract the first routing token when the first routing token is not used by any subsequent nodes. Where a subsequent node may use the first routing token (e.g., the first routing token is associated with two or more network devices), the first routing token may omit extracting the first routing token from the packet.

In some embodiments, the first packet may include handshake data. The handshake data may be used by the server for negotiating (or initiating the negotiation of) a cryptographic context between the service node and server. In such embodiments, the first packet may be used both by the network devices intermediary between the service node and server, and by the service node. The network devices may use the packet for identifying and validating their respective routing tokens, and the service node may use the packet to initiate negotiation of the cryptographic context, which is discussed in greater detail below with reference to operation (925). In some embodiments, the routing tokens may be removed from the handshake data prior to the handshake data being received by the service node. In such embodiments, each (or a subset) of the network devices may remove corresponding routing tokens prior to delivering the packet to the service node. In some embodiments, the routing tokens may remain in the packet delivered to the service node. In such embodiments, the service node may for instance ignore the routing tokens.

At operation (920), and in some embodiments, the server determines whether the network devices validated the network device routing tokens. In some embodiments, the network devices may acknowledge receipt and/or validation of corresponding network device routing tokens. The server may store, determine, identify, etc., the number of network device routing tokens provided in the first packet. The server may determine whether the network devices validated their routing tokens for instance based on whether all acknowledgement messages have been received from the network devices. Where the network devices have not validated all the network device routing tokens, the server may remain idle or refrain from proceeding to the next operation (e.g., loop back to operation 920 until the network devices have received and validated their respective routing tokens). The server may do so until a timeout event (e.g., a predetermined duration of time). When the server determines that the network devices validated their routing tokens, the method 900 may proceed to operation 925. In some embodiments or deployments when the initial handshake data is sent along with routing tokens, there may not be acknowledgement from network devices. Rather, a response for the handshake message from service node can serve as a complete validation and establishment of the service path. In some deployments or embodiments when the initial handshake data is sent with routing tokens, there can be acknowledgement messages from the network devices to the server after validation of the respective routing tokens.

At operation (925), and in some embodiments, the server and service node may establish a cryptographic context. The server and service node may exchange handshake data for establishing the cryptographic context. The cryptographic context may be used for forming a secure channel between the server and service node. In some embodiments, the server may initiate negotiation of the cryptographic context. The server may initiate negotiation of the cryptographic context by transmitting handshake data from the server to the service node. As stated above, in some implementations, the handshake data may be included within the packet containing the routing tokens for the network devices along the network path. In such implementations, negotiation of the cryptographic context may commence when the last network device along the network path receives their respective routing token and passes the packet containing the handshake data (and, in some embodiments, also the routing tokens for the network devices) to the service node.

In some embodiments, once all the network devices validate their respective routing tokens (thus establishing the service connection), the server and service node may negotiate the cryptographic context. A cryptographic context can include or correspond to an encryption or decryption configuration, standard and/or protocol shared between two or more nodes that are in communication with each other. Negotiation of cryptographic context can involve communication between any two or more of the following nodes: server, network devices, service node and/or client. In some embodiments, the server may perform negotiation of the cryptographic context directly with the service node using the handshake data, where the cryptographic context negotiation packets can pass through intermediary network nodes present along the network path already established between the server/service and the service node through routing tokens. In such embodiments, only the server and service node may contribute to or participate in negotiation of the cryptographic context. For instance, the handshake data may pass through the intermediary nodes (e.g., network devices) between the service node and server, without being used or processed at the intermediary nodes.

In some embodiments, the cryptographic context may be an end-to-end cryptographic context between the server and service node. The service node may use the handshake data for negotiating the end-to-end cryptographic context. The end-to-end cryptographic context may be used for establishing a secure channel between the service node and server. An end-to-end cryptographic context can refer to a cryptographic context that extends (e.g., is shared) between a sender (or source) and recipient (or destination) of traffic, and also extends over (e.g., is shared with) network node(s) intermediary between the sender and the recipient. An end-to-end cryptographic context can be configured such that the traffic is not decrypted by any of the intermediary nodes. Accordingly, in-flight and stored data remains encrypted and is not decrypted by intermediary network nodes other than nodes corresponding to the source or final destination. The end-to-end cryptographic context may refer or pertain to encryption of packets throughout the time between encryption by the sender (e.g., source of the packets) and decryption by the recipient (e.g., ultimate destination). In this regard, intermediaries (e.g., network devices, intermediary devices, etc.) may not decrypt the packet in an end-to-end cryptographic context. Rather, in an end-to-end cryptographic context, the packet remains encrypted up to and until the packet reaches the intended recipient.

Negotiation of the cryptographic context can include handshaking communications, passing of information (e.g., including instructions) between or across the nodes, adjustment/acknowledgement/acceptance/counterproposal on the information at certain node(s), and/or establishment of the cryptographic context. As stated above, in embodiments where the cryptographic context is an end-to-end cryptographic context, negotiation of the cryptographic context may occur directly between the service node and server (e.g., using the handshake data and communications, using separate communications, etc.). Hence, the network devices arranged along the service connection may pass through the handshake data and communications (e.g., without themselves processing or using the handshake data), thus permitting direct negotiation of the cryptographic context between the server and service node.

The service node and/or service may form, create, generate, or otherwise establish the (end-to-end) cryptographic context between one another. The cryptographic context may be or include any information regarding a cryptographic arrangement, configuration and/or algorithm (e.g., cryptographic protocol, procedure, process, construct, formulation, key(s), credentials and/or secret(s)) which is/are to be used for encrypting and decrypting network traffic. The cryptographic context can incorporate or include: one or more symmetric-key algorithms, such as block ciphers (e.g., Advance Encryption Standard (AES) of 128 bits or 256 bits, Rivest Cipher-5 (RC5) of 64 bits or 128 bits, or Blowfish cipher), stream ciphers (e.g., A5/1, A5/2, HC-256, or Rivest Cipher-4 (RC4) or 1684 or 2064 bits), or others (e.g., Kerberos protocol); asymmetric-key algorithms (e.g., Digital Signature Algorithm, Elliptic Curve algorithm, Rivest-Shamir-Adleman (RSA), and Diffie-Hellman key exchange protocol); and cryptographic hash functions (e.g., hash-based message authentication code (HMAC), message-digest algorithm (MD5), and Secure Hash Algorithm (SHA-1, SHA-2, and SHA-3)). The cryptographic context can incorporate, specify or include key-related information, such as a set of non-secret key-value pairs. The cryptographic context can provide an indication (e.g., an identifier, handle, name and/or type) of a cryptographic service provider (CSP), and can include the specification of a particular key container (e.g., within the CSP). The cryptographic context can incorporate, specify or include information (e.g., parameters) for creating, establishing, identifying, accessing and/or using a key container and/or keys (e.g., a session key).

The service node and/or the server may form, create, generate, or otherwise establish the end-to-end cryptographic context between the service node and the server through the network devices. The service node and/or server may establish the end-to-end cryptographic context following (or before, or in parallel with, or independent of) transmission or passing of the packet containing the network device routing tokens. The service node and/or server may establish the end-to-end cryptographic context for forming a secure channel by which traffic is exchanged between the server and the client.

In some embodiments, the server may validate the service node during negotiation of the cryptographic context. In some embodiments, the service node may validate the server during negotiation of the cryptographic context. Hence, the server may validate the service node and/or the service node may validate the server. The server and service node may validate one another using the same method or different respective methods. The server and service node may validate one another in a manner similar to validation of the routing tokens described above with reference to operation (915). For instance, the server and/or service node may validate one another based on a public/private key, a pre-shared key, a unique identifier or parameter, etc.

In some embodiments, validation of the server and/or the service node may not occur, or may be omitted, bypassed or skipped. For instance, where the server and service node are both trusted (e.g., manufactured by the same entity, previously validated or authenticated with each other), the server and/or service node may omit validation of one another. Such embodiments may expedite delivery of network content.

At operation (930), and in some embodiments, the server may transmit a service node routing token. In some embodiments, the server transmits the service node routing token to be validated by the service node. The server may transmit the service node routing token to the service node via the secure channel. Hence, the server may transmit the service node routing token separate from the packet containing the routing tokens for the network devices and/or after the end-to-end cryptographic context is established between the server and the service node.

The service node may receive the service node routing token from the server. The service node routing token may be similar in some aspects to the network device routing token. For instance, the service node routing token may include identification information corresponding to the sender (e.g., the server) and the recipient (e.g., the service node). Such identification information may be contained in a header for the service node routing token, a payload, etc. The service node may extract the identification information for the service node routing token from the server. The service node may extract, identify, locate, decipher, or otherwise read data or other information from the service node routing token. The service node may use the data read to validate the service node routing token.

As described above, the validation of the service connection, service node and/or server may occur during negotiation of the cryptographic context. In some embodiments, the service node may (e.g., additionally) validate the server and/or service connection upon receipt of the service node routing token. For instance, the service node routing token may contain or otherwise include information for the service node to validate/authenticate the server/service connection. The service node may validate/authenticate the server or service connection based on the information contained in the service node routing token.

In some embodiments, the server may validate the service connection by authenticating the service node over the secure channel established between the service node and the server along the network path established using routing tokens. Authentication data/packets exchanged between the service node and the server may be protected by the end-to-end cryptographic context. The request from the client may include authentication information corresponding to the server (e.g., the STA ticket). The service node may fetch, retrieve, or otherwise access information from an associated server (e.g., an STA server) for authenticating to the server. The service node may retrieve the information from the STA server based on the STA ticket (e.g., information contained in the STA ticket). The server may authenticate the service node based on a comparison of the information contained in the STA ticket and information retrieved from the STA server (e.g., the respective information matching thus indicating that the server is in fact the server which hosts the service requested by the client). While this embodiment of authenticating to the server is described, the service node may authenticate to the server using other authentication methods such as, for instance, an ID, tag, unique identifier, address, digital fingerprint, credentials, certificate, etc. In some embodiments, the server 502 may authenticate the service node 506, using data directly received in one or more packets from the client 504.

At operation (935), and in some embodiments, the service node may route network traffic. The service node may identify a client connection between the client and service node. The service node may identify the client connection based on information contained or otherwise incorporated into the service node routing token. Such information may be or include, for instance, a client address (IP address), port information, an identifier associated with the client, etc. The service node may identify the client based on the information in the service node routing token. As stated above, in some implementations, the client connection may have a local cryptographic context (e.g., a cryptographic context shared between the service node and client).

The server may cause the service node to communicate network traffic between the client and the server. The service node may communicate network traffic using the local cryptographic context across the client connection. The service node may communicate network traffic using the established cryptographic context (e.g., at operation (925)) across the secure channel between the service node and server. Where encrypted network traffic is received by the service node from the client, the service node may decrypt the network traffic according to the local cryptographic context established between the client and the service node, re-encrypt the network traffic according to the established cryptographic context (e.g., for use between the service node and the server), and direct the re-encrypted network traffic to the server via the service connection. Where encrypted network traffic is received by the service node from the server, the service node may decrypt the network traffic according to the established cryptographic context (e.g., in connection with operation (925)), re-encrypt the network traffic according to the local cryptographic context, and direct the re-encrypted network traffic to the client via the client connection.

The server may communicate network traffic with the service node using the established cryptographic context without decrypting or re-encrypting the network traffic at each of the plurality of network devices. Hence, the network traffic may be encrypted by the source (e.g., the server or the service node) according to the end-to-end cryptographic context, passed through by each of the network devices along the service connection to the next network device without decrypting and/or re-encrypting the network traffic, and decrypted at the destination (e.g., the other one of the service or service node). As such, the network devices may act or operate in a "bit-pump" mode, where the network devices pass data to the next node along the service connection without any decrypting and deciphering of the network traffic.

Various elements, which are described herein in the context of one or more embodiments, may be provided separately or in any suitable sub-combination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

It will be further understood that various changes in the details, materials, and arrangements of the parts that have been described and illustrated herein may be made by those skilled in the art without departing from the scope of the following claims.

We claim:

1. A method comprising:
   receiving, by a first computing device, a plurality of tokens for establishing a secure connection between the first computing device and a second computing device via one or more third computing devices intermediary to the first computing device and the second computing device, each of the plurality of tokens being specific to a respective computing device of the one or more third computing devices and configured to be validated by the respective computing device;
   communicating, by the first computing device, the plurality of tokens to the one or more third computing devices along a network path to the second computing device to cause each of the one or more third computing devices to validate respective tokens of the plurality of tokens; and
   establishing between the first computing device and the second computing device a secure connection via the network path of the one or more third computing devices responsive to each of the plurality of tokens being validated by the one or more third computing devices.

2. The method of claim 1, further comprising communicating by the first computing device to the second computing device, a second token to be validated by the second computing device for establishing the secure connection.

3. The method of claim 1, further comprising communicating, by the first computing device to the second computing device, handshake data for establishing the secure connection.

4. The method of claim 1, wherein the plurality of tokens is included in handshake data for establishing the secure connection.

5. The method of claim 1, further comprising communicating, by the first computing device, the plurality of tokens via a packet transmitted to the one or more third computing devices.

6. The method of claim 1, where each of the plurality of tokens is valid for one of a predetermined time or a single use.

7. The method of claim 1, further comprising communicating data over the secure connection between the first computing device and the second computing device via the one or more third computing devices without one of decryption or encryption by the one or more third computing devices.

8. A system comprising:
   a first computing device comprising one or more processors, coupled to memory and configured to:
   receive a plurality of tokens for establishing a secure connection between the first computing device and a second computing device via one or more third computing devices intermediary to the first computing device and the second computing device, each of the plurality of tokens being specific to a respective computing device of the one or more third computing devices and configured to be validated by the respective computing device;
   communicate the plurality of tokens to the one or more third computing devices along a network path to the second computing device to cause the one or more third computing devices to validate respective tokens of the plurality of tokens; and
   establish between the first computing device and the second computing device a secure connection via the network path of the one or more third computing devices responsive to at least each of the plurality of tokens being validated by each of the one or more third computing devices.

9. The system of claim 8, wherein the first computing device is further configured to communicate to the second computing device a second token to be validated by the second computing device in order to establish the secure connection.

10. The system of claim 8, wherein the first computing device is further configured to communicate to the second computing device handshake data used to establish the secure connection.

11. The system of claim 8, wherein the plurality of tokens is included in handshake data for establishing the secure connection.

12. The system of claim 8, wherein the first computing device is further configured to communicate the plurality of tokens via a packet transmitted to the one or more third computing devices.

13. The system of claim 8, where each of the plurality of tokens is valid for one of a predetermined time or a single use.

14. The system of claim 8, wherein the first computing device is further configured to communicate data over the secure connection between the first computing device and the second computing device via the one or more third computing devices without one of decryption or encryption by the one or more third computing devices.

15. A system comprising:
    a server in communication with a controller via one or more networks, the server configured to:
    receive a plurality of tokens from the controller in response to a request by a client device to access a service on a remote computing device, wherein each of the plurality of tokens is configured to be validated by a corresponding intermediary device of one or more intermediary devices along a network path between the server and the remote computing device to establish a secure connection for the client's access to the service provided by the remote computing device; and communicate the plurality of tokens to the one or more intermediary devices along the network path to the remote computing device to cause the one or intermediary devices and the remote computing device to validate each of their corresponding token of the plurality of tokens, wherein each token of the plurality of tokens is specific to a respective intermediary device of the one or more intermediary devices; and establish a secure connection between the server and the remote computing device via the network path of the one or more third computing devices responsive to at least each of the plurality of tokens being validated.

16. The system of claim 15, wherein the controller is deployed on one or more networks external to one of the client device or the server.

17. The system of claim 15, wherein the server is further configured to initiate negotiation of a cryptographic content with a next device of the one or more intermediary devices in the network path by communicating a packet comprising handshake information.

18. The system of claim 15, where each of the plurality of tokens is valid for one of a predetermined time or a single use.

19. The system of claim 15, wherein the server is further configured to establish a connection with the client responsive to the request.

20. The system of claim 15, wherein the server is further configured to communicate data over the secure connection between the server and the remote computing device via the one or more intermediary devices without one of decryption or encryption by the one or more intermediary devices.

* * * * *